US012771153B2

(12) United States Patent
Sanchez et al.

(10) Patent No.: US 12,771,153 B2
(45) Date of Patent: Oct. 20, 2026

(54) ENVIRONMENT-INTEGRATED SMART RING CHARGER

(71) Applicant: QUANATA, LLC, San Francisco, CA (US)

(72) Inventors: Kenneth Jason Sanchez, San Francisco, CA (US); Theobolt N. Leung, San Francisco, CA (US); Eric Dahl, Newman Lake, WA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

(21) Appl. No.: 19/322,497

(22) Filed: Sep. 8, 2025

(65) Prior Publication Data

US 2026/0001556 A1 Jan. 1, 2026

Related U.S. Application Data

(63) Continuation of application No. 19/189,734, filed on Apr. 25, 2025, now Pat. No. 12,479,445, which is a (Continued)

(51) Int. Cl.
*H01M 10/44* (2006.01)
*A44C 9/00* (2006.01)
(Continued)

(52) U.S. Cl.
CPC .............. *H02J 7/70* (2026.01); *A44C 9/0053* (2013.01); *B60W 40/08* (2013.01);
(Continued)

(58) Field of Classification Search
CPC ........ H02J 7/70; H02J 7/02; H02J 7/40; H02J 7/80; H02J 7/42; H02J 7/855; H02J 7/751;
(Continued)

(56) References Cited

U.S. PATENT DOCUMENTS

| | | | |
|---|---|---|---|
| 2,737,192 A | 3/1956 | Bieler | |
| 3,792,192 A | 2/1974 | Plate | |

(Continued)

FOREIGN PATENT DOCUMENTS

| | | | |
|---|---|---|---|
| AU | 2014218612 A1 * | 8/2015 | ............. H02J 7/731 |
| AU | 2017324615 A1 | 2/2019 | |

(Continued)

OTHER PUBLICATIONS https://en.wikipdia.org/w/index.php?title=Ring_size&oldid=891328817 (2019) 2019.

(Continued)

*Primary Examiner* — Edward Tso
(74) *Attorney, Agent, or Firm* — BRYAN CAVE LEIGHTON PAISNER LLP

(57) ABSTRACT

A charging system can include a housing. The housing can include a controller. The housing also can include a power source configured to power the controller. The charging system also can include a wireless charger configured to transfer energy to the power source. The wireless charger can include a first non-flashing visual output at a first brightness. The wireless charger also can include a second non-flashing visual output at a second brightness. Other embodiments are disclosed.

20 Claims, 5 Drawing Sheets

Related U.S. Application Data continuation of application No. 18/975,246, filed on Dec. 10, 2024, now Pat. No. 12,515,677, which is a continuation of application No. 18/234,180, filed on Aug. 15, 2023, now Pat. No. 12,237,700, which is a continuation of application No. 17/937,576, filed on Oct. 3, 2022, now Pat. No. 11,894,704, which is a continuation of application No. 16/929,641, filed on Jul. 15, 2020, now Pat. No. 11,909,238.

(60) Provisional application No. 62/990,123, filed on Mar. 16, 2020, provisional application No. 62/877,391, filed on Jul. 23, 2019.

(51) Int. Cl.

| | |
|---|---|
| ***B60W 40/08*** | (2012.01) |
| ***B60W 50/00*** | (2006.01) |
| ***B60W 50/14*** | (2020.01) |
| ***G01S 19/42*** | (2010.01) |
| ***G06N 5/04*** | (2023.01) |
| ***G06N 20/00*** | (2019.01) |
| ***H01M 10/46*** | (2006.01) |
| ***H02J 7/02*** | (2016.01) |
| ***H02J 7/40*** | (2026.01) |
| ***H02J 7/70*** | (2026.01) |
| ***H02J 7/80*** | (2026.01) |

(52) U.S. Cl.

CPC ........ *B60W 50/0097* (2013.01); *B60W 50/14* (2013.01); *G01S 19/42* (2013.01); *G06N 5/04* (2013.01); *G06N 20/00* (2019.01); *H02J 7/02* (2013.01); *H02J 7/40* (2026.01); *H02J 7/80* (2026.01); *B60W 2040/0836* (2013.01); *B60W 2040/0845* (2013.01); *B60W 2040/0872* (2013.01); *B60W 2540/221* (2020.02); *B60W 2540/24* (2013.01); *B60W 2540/26* (2013.01)

(58) Field of Classification Search

CPC .. B60W 40/08; B60W 50/0097; B60W 50/14; B60W 2540/221; B60W 2540/24; B60W 2540/26; B60W 2040/0872; B60W 2040/0845; B60W 2040/0836; G06N 5/04; G06N 20/00

USPC .......................... 320/107, 108, 114, 115, 132

See application file for complete search history.

(56) References Cited

U.S. PATENT DOCUMENTS

| | | | |
|---|---|---|---|
| 4,012,629 | A | 3/1977 | Simms |
| 4,382,112 | A | 5/1983 | Betts et al. |
| 4,684,687 | A | 8/1987 | Breach et al. |
| 4,830,014 | A | 5/1989 | Goodman et al. |
| 4,880,304 | A | 11/1989 | Jaeb et al. |
| 5,135,220 | A | 8/1992 | Baldoni |
| 6,097,480 | A | 8/2000 | Kaplan |
| 6,154,658 | A | 11/2000 | Caci |
| 6,201,698 | B1 | 3/2001 | Hunter |
| 6,560,993 | B1 | 5/2003 | Bosque et al. |
| 6,608,562 | B1 | 8/2003 | Kimura et al. |
| 6,699,199 | B2 | 3/2004 | Asada et al. |
| 6,745,061 | B1 | 6/2004 | Hicks et al. |
| 6,792,044 | B2 | 9/2004 | Peng et al. |
| 6,800,693 | B2 | 10/2004 | Nishihara et al. |
| 6,803,391 | B2 | 10/2004 | Paglia et al. |
| 6,805,140 | B2 | 10/2004 | Velez, Jr. et al. |
| 6,894,628 | B2 | 5/2005 | Marpe et al. |
| 6,909,753 | B2 | 6/2005 | Meehan et al. |
| 6,959,116 | B2 | 10/2005 | Sezer et al. |
| 7,013,674 | B2 | 3/2006 | Kretchmer |
| 7,136,532 | B2 | 11/2006 | VanDer |
| 7,190,986 | B1 | 3/2007 | Hannula et al. |
| 7,227,894 | B2 | 6/2007 | Lin et al. |
| 7,286,710 | B2 | 10/2007 | Marpe et al. |
| 7,468,036 | B1 | 12/2008 | Rulkov et al. |
| 7,500,697 | B2 | 3/2009 | Romack |
| 7,500,746 | B1 | 3/2009 | Howell et al. |
| 7,519,229 | B2 | 4/2009 | Wallace et al. |
| 7,689,437 | B1 | 3/2010 | Teller et al. |
| 7,872,444 | B2 | 1/2011 | Hamilton et al. |
| 8,031,172 | B2 | 10/2011 | Kruse et al. |
| 8,075,484 | B2 | 12/2011 | Moore-ede |
| 8,345,752 | B2 | 1/2013 | Lee et al. |
| 8,446,275 | B2 | 5/2013 | Utter, II |
| 8,554,297 | B2 | 10/2013 | Moon et al. |
| 8,570,273 | B1 | 10/2013 | Smith |
| 8,624,554 | B2 | 1/2014 | Ajagbe |
| 8,700,111 | B2 | 4/2014 | Leboeuf et al. |
| 8,954,135 | B2 | 2/2015 | Yuen et al. |
| 9,218,058 | B2 | 12/2015 | Bress et al. |
| 9,248,839 | B1 | 2/2016 | Tan |
| 9,248,938 | B2 | 2/2016 | Hopps |
| 9,265,310 | B2 | 2/2016 | Lam |
| 9,362,775 | B1 | 6/2016 | Jacobs |
| 9,420,260 | B2 | 8/2016 | McGregor et al. |
| 9,440,657 | B1 | 9/2016 | Fields et al. |
| 9,477,146 | B2 | 10/2016 | Xu et al. |
| 9,509,170 | B2 | 11/2016 | Wu |
| 9,628,707 | B2 | 4/2017 | Blum et al. |
| 9,660,488 | B2 | 5/2017 | Breedvelt-Schouten et al. |
| 9,696,690 | B2 | 7/2017 | Nguyen et al. |
| 9,711,060 | B1 | 7/2017 | Lusted et al. |
| 9,711,993 | B2 | 7/2017 | Kim |
| 9,717,949 | B1 | 8/2017 | Tran et al. |
| 9,733,700 | B2 | 8/2017 | Song et al. |
| 9,756,301 | B2 | 9/2017 | Li et al. |
| 9,798,458 | B2 | 10/2017 | Dumont et al. |
| 9,841,331 | B2 | 12/2017 | Wood et al. |
| 9,847,020 | B2 | 12/2017 | Davis |
| 9,861,314 | B2 | 1/2018 | Haverinen et al. |
| 9,880,620 | B2 | 1/2018 | Kienzle et al. |
| 9,908,530 | B1 | 3/2018 | Fields et al. |
| 9,931,976 | B1 | 4/2018 | Terwilliger et al. |
| 9,955,286 | B2 | 4/2018 | Segal |
| 9,956,963 | B2 | 5/2018 | Vijaya Kumar et al. |
| 9,965,761 | B2 | 5/2018 | Elangovan et al. |
| 10,007,355 | B2 | 6/2018 | Schorsch et al. |
| 10,043,125 | B2 | 8/2018 | Park |
| 10,085,695 | B2 | 10/2018 | Ouwerkerk et al. |
| 10,099,608 | B2 | 10/2018 | Cuddihy et al. |
| 10,102,510 | B2 | 10/2018 | Yau et al. |
| 10,137,777 | B2 | 11/2018 | Lu et al. |
| 10,139,859 | B2 | 11/2018 | Von Badinski et al. |
| 10,192,171 | B2 | 1/2019 | Taylor |
| 10,252,016 | B2 | 4/2019 | Pedro et al. |
| 10,281,953 | B2 | 5/2019 | Bandinski |
| 10,303,867 | B2 | 5/2019 | Schröder |
| 10,315,557 | B2 | 6/2019 | Terwilliger et al. |
| 10,317,940 | B2 | 6/2019 | Eim et al. |
| 10,345,506 | B1 | 7/2019 | Lyu |
| 10,359,846 | B2 | 7/2019 | Priyantha et al. |
| 10,366,220 | B2 | 7/2019 | Shapiro et al. |
| 10,377,386 | B2 | 8/2019 | Richmond |
| 10,384,647 | B2 | 8/2019 | Tayama |
| 10,396,584 | B2 | 8/2019 | Madau et al. |
| 10,409,327 | B2 | 9/2019 | Stotler |
| 10,444,834 | B2 | 10/2019 | Vescovi et al. |
| 10,463,141 | B2 | 11/2019 | Fitzgerald et al. |
| 10,509,994 | B1 | 12/2019 | Huynh |
| 10,528,989 | B1 | 1/2020 | Irey |
| 10,564,628 | B2 | 2/2020 | Hargovan et al. |
| 10,629,175 | B2 | 4/2020 | Yan et al. |
| 10,664,842 | B1 | 5/2020 | Bermudez et al. |
| 10,679,296 | B1 | 6/2020 | Devereaux et al. |
| 10,681,818 | B1 | 6/2020 | Graber et al. |
| 10,693,872 | B1 | 6/2020 | Larson et al. |
| 10,701,067 | B1 | 6/2020 | Ziraknejad |
| 10,703,204 | B2 | 7/2020 | Hassan et al. |
| 10,709,339 | B1 | 7/2020 | Lusted |
| 10,713,726 | B1 | 7/2020 | Allen et al. |

(56) References Cited

U.S. PATENT DOCUMENTS

| | | | |
|---|---|---|---|
| 10,745,032 B2 | 8/2020 | Scheggi | |
| 10,762,183 B1 | 9/2020 | Charan et al. | |
| 10,768,666 B2 | 9/2020 | Von Badinski et al. | |
| 10,838,499 B2 | 11/2020 | Wang | |
| 10,842,429 B2 | 11/2020 | Kinnunen et al. | |
| 10,849,557 B2 | 12/2020 | Keating | |
| 10,893,833 B2 | 1/2021 | Haverinen et al. | |
| 10,944,745 B2 | 3/2021 | Kursun et al. | |
| 11,056,242 B1 | 7/2021 | Jain et al. | |
| 11,127,506 B1 | 9/2021 | Jain et al. | |
| 11,227,060 B1 | 1/2022 | John et al. | |
| 11,237,640 B2 | 2/2022 | Zhu et al. | |
| 11,265,635 B2 | 3/2022 | Shankar | |
| 11,271,290 B2 | 3/2022 | McLear et al. | |
| 11,312,299 B1 | 4/2022 | Assam | |
| 11,342,051 B1 | 5/2022 | Jain et al. | |
| 11,456,080 B1 | 9/2022 | Jain et al. | |
| 11,479,258 B1 | 10/2022 | Sanchez | |
| 11,504,011 B1 | 11/2022 | Jain et al. | |
| 11,599,147 B2 | 3/2023 | Von Badinski et al. | |
| 11,601,424 B2 | 3/2023 | Fukuda | |
| 11,637,511 B2 | 4/2023 | Sanchez | |
| 11,714,494 B2 | 8/2023 | D'Amone et al. | |
| 11,868,178 B2 | 1/2024 | Von Badinski et al. | |
| 11,868,179 B2 | 1/2024 | Von Badinski et al. | |
| 11,894,704 B2 | 2/2024 | Sanchez | |
| 11,909,238 B1 | 2/2024 | Sanchez | |
| 11,914,780 B2 | 2/2024 | Wang et al. | |
| 11,923,791 B2 | 3/2024 | Sanchez | |
| 11,984,742 B2 | 5/2024 | Sanchez | |
| 11,990,954 B2 | 5/2024 | Kato et al. | |
| 12,077,193 B1 | 9/2024 | Sanchez | |
| 12,191,692 B2 | 1/2025 | Sanchez | |
| 12,211,467 B2 | 1/2025 | Sanchez | |
| 12,237,700 B2 | 2/2025 | Sanchez et al. | |
| 12,441,332 B2 | 10/2025 | Sanchez | |
| 12,479,445 B2 * | 11/2025 | Sanchez ................ | B60W 40/08 |
| 12,500,429 B2 | 12/2025 | Sanchez et al. | |
| 12,597,790 B2 | 4/2026 | Sanchez | |
| 2002/0042464 A1 | 4/2002 | Barclay et al. | |
| 2002/0091568 A1 | 7/2002 | Kraft et al. | |
| 2002/0121831 A1 | 9/2002 | Egawa et al. | |
| 2003/0077064 A1 | 4/2003 | Katayama | |
| 2003/0142065 A1 | 7/2003 | Pahlavan | |
| 2004/0090210 A1 | 5/2004 | Becker et al. | |
| 2004/0102551 A1 | 5/2004 | Sato et al. | |
| 2004/0118592 A1 | 6/2004 | Pehlert | |
| 2004/0145256 A1 | 7/2004 | Miekka | |
| 2004/0160635 A1 | 8/2004 | Ikeda et al. | |
| 2004/0200235 A1 | 10/2004 | Kretchmer | |
| 2005/0012648 A1 | 1/2005 | Marpe et al. | |
| 2005/0030205 A1 | 2/2005 | Konoshima et al. | |
| 2005/0054941 A1 | 3/2005 | Ting et al. | |
| 2005/0062454 A1 | 3/2005 | Raghunath et al. | |
| 2005/0133248 A1 | 6/2005 | Easter | |
| 2005/0162523 A1 | 7/2005 | Darrell et al. | |
| 2005/0185060 A1 | 8/2005 | Neven, Sr. | |
| 2005/0185843 A1 | 8/2005 | Kudoh | |
| 2005/0185844 A1 | 8/2005 | Ono et al. | |
| 2005/0230596 A1 | 10/2005 | Howell et al. | |
| 2006/0002607 A1 | 1/2006 | Boncyk et al. | |
| 2006/0069681 A1 | 3/2006 | Lauper | |
| 2006/0080286 A1 | 4/2006 | Svendsen | |
| 2006/0085477 A1 | 4/2006 | Phillips et al. | |
| 2006/0089792 A1 | 4/2006 | Manber et al. | |
| 2006/0211924 A1 | 9/2006 | Dalke et al. | |
| 2006/0250043 A1 | 11/2006 | Chung | |
| 2006/0271593 A1 | 11/2006 | De Mes et al. | |
| 2007/0149222 A1 | 6/2007 | Hodko et al. | |
| 2007/0159522 A1 | 7/2007 | Neven | |
| 2007/0188626 A1 | 8/2007 | Squilla et al. | |
| 2007/0200713 A1 | 8/2007 | Weber et al. | |
| 2007/0223826 A1 | 9/2007 | Ridge et al. | |
| 2008/0068559 A1 | 3/2008 | Howell et al. | |
| 2008/0136587 A1 | 6/2008 | Orr | |
| 2008/0174676 A1 | 7/2008 | Squilla et al. | |
| 2008/0218684 A1 | 9/2008 | Howell et al. | |
| 2008/0275309 A1 | 11/2008 | Stivoric et al. | |
| 2009/0056703 A1 | 3/2009 | Mills et al. | |
| 2010/0219989 A1 | 9/2010 | Asami et al. | |
| 2011/0007035 A1 | 1/2011 | Shai | |
| 2011/0080339 A1 | 4/2011 | Sun et al. | |
| 2011/0224875 A1 | 9/2011 | Cuddihy et al. | |
| 2012/0016245 A1 | 1/2012 | Niwa et al. | |
| 2012/0075196 A1 | 3/2012 | Ashbrook et al. | |
| 2012/0130203 A1 | 5/2012 | Stergiou et al. | |
| 2012/0184367 A1 | 7/2012 | Parrott et al. | |
| 2012/0218184 A1 | 8/2012 | Wissmar | |
| 2012/0293107 A1 | 11/2012 | Ajagbe | |
| 2012/0317024 A1 | 12/2012 | Rahman et al. | |
| 2013/0106603 A1 | 5/2013 | Weast et al. | |
| 2013/0211291 A1 | 8/2013 | Tran | |
| 2013/0335213 A1 | 12/2013 | Sherony et al. | |
| 2014/0091659 A1 | 4/2014 | Suzuki et al. | |
| 2014/0107493 A1 | 4/2014 | Yuen et al. | |
| 2014/0118704 A1 | 5/2014 | Duelli et al. | |
| 2014/0120983 A1 | 5/2014 | Lam | |
| 2014/0187160 A1 | 7/2014 | Prencipe | |
| 2014/0218529 A1 | 8/2014 | Mahmoud et al. | |
| 2014/0238153 A1 | 8/2014 | Wood et al. | |
| 2014/0240132 A1 | 8/2014 | Bychkov | |
| 2014/0244009 A1 | 8/2014 | Mestas | |
| 2014/0267024 A1 | 9/2014 | Keller et al. | |
| 2014/0274203 A1 | 9/2014 | Ganong, III | |
| 2014/0309849 A1 | 10/2014 | Ricci | |
| 2014/0361934 A1 | 12/2014 | Ely et al. | |
| 2014/0361945 A1 | 12/2014 | Misra et al. | |
| 2015/0003693 A1 | 1/2015 | Baca et al. | |
| 2015/0019266 A1 | 1/2015 | Stempora | |
| 2015/0028996 A1 | 1/2015 | Agrafioti | |
| 2015/0029089 A1 | 1/2015 | Kim | |
| 2015/0046996 A1 | 2/2015 | Slaby et al. | |
| 2015/0062086 A1 | 3/2015 | Nattukallingal | |
| 2015/0065090 A1 | 3/2015 | Yeh | |
| 2015/0098309 A1 | 4/2015 | Adams | |
| 2015/0110279 A1 | 4/2015 | Tejerina | |
| 2015/0124096 A1 | 5/2015 | Koravadi | |
| 2015/0126824 A1 | 5/2015 | Leboeuf et al. | |
| 2015/0133193 A1 | 5/2015 | Stotler | |
| 2015/0158499 A1 | 6/2015 | Koravadi | |
| 2015/0186092 A1 | 7/2015 | Francis et al. | |
| 2015/0220109 A1 | 8/2015 | Von Badinski et al. | |
| 2015/0277559 A1 | 10/2015 | Vescovi et al. | |
| 2015/0287412 A1 | 10/2015 | Tang | |
| 2015/0338926 A1 | 11/2015 | Park et al. | |
| 2015/0352953 A1 | 12/2015 | Koravadi | |
| 2016/0028267 A1 | 1/2016 | Lee et al. | |
| 2016/0098530 A1 | 4/2016 | Dill et al. | |
| 2016/0189149 A1 | 6/2016 | MacLaurin et al. | |
| 2016/0192407 A1 | 6/2016 | Fyfe et al. | |
| 2016/0207454 A1 | 7/2016 | Cuddihy | |
| 2016/0226313 A1 | 8/2016 | Okubo | |
| 2016/0236692 A1 | 8/2016 | Kleen et al. | |
| 2016/0266606 A1 | 9/2016 | Ricci | |
| 2016/0292563 A1 | 10/2016 | Park | |
| 2016/0317060 A1 | 11/2016 | Connor | |
| 2016/0334901 A1 | 11/2016 | Rihn | |
| 2016/0336758 A1 | 11/2016 | Breedvelt-Schouten et al. | |
| 2016/0350581 A1 | 12/2016 | Manel et al. | |
| 2016/0361032 A1 | 12/2016 | Carter et al. | |
| 2017/0010677 A1 | 1/2017 | Roh et al. | |
| 2017/0012925 A1 | 1/2017 | Tekin et al. | |
| 2017/0024008 A1 | 1/2017 | Kienzle et al. | |
| 2017/0026790 A1 | 1/2017 | Flitsch et al. | |
| 2017/0042477 A1 | 2/2017 | Haverinen et al. | |
| 2017/0053461 A1 | 2/2017 | Pal et al. | |
| 2017/0057492 A1 | 3/2017 | Eddington et al. | |
| 2017/0070078 A1 | 3/2017 | Hwang et al. | |
| 2017/0075701 A1 | 3/2017 | Ricci et al. | |
| 2017/0080952 A1 | 3/2017 | Gupta et al. | |
| 2017/0090475 A1 | 3/2017 | Choi et al. | |
| 2017/0109512 A1 | 4/2017 | Bower et al. | |
| 2017/0129335 A1 | 5/2017 | Lu et al. | |
| 2017/0131772 A1 | 5/2017 | Choi | |

(56) References Cited

U.S. PATENT DOCUMENTS

| | | | | |
|---|---|---|---|---|
| 2017/0150255 | A1 | 5/2017 | Wang et al. | |
| 2017/0190121 | A1 | 7/2017 | Aggarwal et al. | |
| 2017/0192530 | A1 | 7/2017 | Lee | |
| 2017/0242428 | A1 | 8/2017 | Pal et al. | |
| 2017/0251967 | A1 | 9/2017 | Premsukh | |
| 2017/0336964 | A1 | 11/2017 | Kim | |
| 2017/0346635 | A1 | 11/2017 | Gummeson et al. | |
| 2017/0347895 | A1 | 12/2017 | Wei et al. | |
| 2017/0355377 | A1 | 12/2017 | Vijaya Kumar et al. | |
| 2017/0374074 | A1 | 12/2017 | Stuntebeck | |
| 2018/0025351 | A1 | 1/2018 | Chen et al. | |
| 2018/0025430 | A1 | 1/2018 | Perl et al. | |
| 2018/0032126 | A1 | 2/2018 | Liu | |
| 2018/0037228 | A1 | 2/2018 | Biondo et al. | |
| 2018/0039303 | A1 | 2/2018 | Hashimoto | |
| 2018/0052428 | A1 | 2/2018 | Abramov | |
| 2018/0054513 | A1 | 2/2018 | Ma | |
| 2018/0068105 | A1 | 3/2018 | Shapiro et al. | |
| 2018/0093606 | A1 | 4/2018 | Terwilliger et al. | |
| 2018/0093610 | A1 | 4/2018 | Sun et al. | |
| 2018/0093672 | A1 | 4/2018 | Terwilliger et al. | |
| 2018/0115797 | A1 | 4/2018 | Wexler et al. | |
| 2018/0120891 | A1 | 5/2018 | Eim | |
| 2018/0120892 | A1 | 5/2018 | Von Badinski et al. | |
| 2018/0123629 | A1 | 5/2018 | Wetzig | |
| 2018/0167200 | A1 | 6/2018 | High et al. | |
| 2018/0174457 | A1 | 6/2018 | Taylor | |
| 2018/0178712 | A1 | 6/2018 | Terwilliger et al. | |
| 2018/0229674 | A1 | 8/2018 | Heinrich et al. | |
| 2018/0256027 | A1 | 9/2018 | Lacher | |
| 2018/0257668 | A1 | 9/2018 | Tonshal | |
| 2018/0262505 | A1 | 9/2018 | Ligatti | |
| 2018/0292901 | A1 | 10/2018 | Priyantha et al. | |
| 2018/0300467 | A1 | 10/2018 | Kwong et al. | |
| 2018/0322957 | A1 | 11/2018 | Dill et al. | |
| 2018/0352166 | A1 | 12/2018 | Silic | |
| 2019/0004325 | A1 | 1/2019 | Connor | |
| 2019/0049267 | A1 | 2/2019 | Huang | |
| 2019/0082968 | A1 | 3/2019 | Karnik et al. | |
| 2019/0083022 | A1 | 3/2019 | Huang | |
| 2019/0131812 | A1 | 5/2019 | Lee et al. | |
| 2019/0155104 | A1 | 5/2019 | Li et al. | |
| 2019/0155385 | A1 | 5/2019 | Lim et al. | |
| 2019/0172289 | A1 | 6/2019 | O'Toole et al. | |
| 2019/0191998 | A1 | 6/2019 | Heikenfeld et al. | |
| 2019/0202464 | A1 | 7/2019 | Mcgill | |
| 2019/0213429 | A1 | 7/2019 | Sicconi et al. | |
| 2019/0229909 | A1 | 7/2019 | Patel et al. | |
| 2019/0230507 | A1 | 7/2019 | Li et al. | |
| 2019/0265868 | A1 | 8/2019 | Penilla et al. | |
| 2019/0286805 | A1 | 9/2019 | Law et al. | |
| 2019/0287083 | A1 | 9/2019 | Wurmfeld et al. | |
| 2019/0295440 | A1 | 9/2019 | Hadad | |
| 2019/0298173 | A1 | 10/2019 | Lawrence et al. | |
| 2019/0298265 | A1 | 10/2019 | Keating | |
| 2019/0313967 | A1 | 10/2019 | Lee | |
| 2019/0332140 | A1 | 10/2019 | Wang et al. | |
| 2019/0332787 | A1 | 10/2019 | Graf et al. | |
| 2019/0342329 | A1 | 11/2019 | Turgeman | |
| 2019/0357834 | A1 | 11/2019 | Aarts et al. | |
| 2020/0001895 | A1 | 1/2020 | Scheggi | |
| 2020/0005291 | A1 | 1/2020 | Spence et al. | |
| 2020/0005791 | A1 | 1/2020 | Rakshit et al. | |
| 2020/0062276 | A1 | 2/2020 | Yuan et al. | |
| 2020/0070840 | A1 | 3/2020 | Gunaratne | |
| 2020/0142497 | A1 | 5/2020 | Zhu | |
| 2020/0159896 | A1 | 5/2020 | Shapiro et al. | |
| 2020/0218238 | A1 | 7/2020 | Wang | |
| 2020/0356652 | A1 | 11/2020 | Yamaguchi et al. | |
| 2020/0391696 | A1 | 12/2020 | Kato et al. | |
| 2020/0401183 | A1 | 12/2020 | Von Badinski et al. | |
| 2021/0019731 | A1 | 1/2021 | Rule et al. | |
| 2021/0029112 | A1 | 1/2021 | Palle et al. | |
| 2021/0058692 | A1 | 2/2021 | Shankar | |
| 2021/0197849 | A1 | 7/2021 | Tsuji | |
| 2021/0210982 | A1* | 7/2021 | Wallace | H01F 38/14 |
| 2021/0382684 | A1 | 12/2021 | Hachiya et al. | |
| 2022/0083149 | A1 | 3/2022 | Keller et al. | |
| 2022/0233142 | A1 | 7/2022 | Hasan et al. | |
| 2022/0320899 | A1 | 10/2022 | Sanchez et al. | |
| 2023/0027131 | A1 | 1/2023 | Sanchez et al. | |
| 2023/0225671 | A1 | 7/2023 | Kosman et al. | |

FOREIGN PATENT DOCUMENTS

| | | | | |
|---|---|---|---|---|
| CN | 103109462 | A | 5/2013 | |
| CN | 104157116 | A | 11/2014 | |
| CN | 104799509 | | 7/2015 | |
| CN | 105683900 | A | 6/2016 | |
| CN | 105960196 | | 9/2016 | |
| CN | 106360895 | | 2/2017 | |
| CN | 206213423 | | 6/2017 | |
| CN | 206333477 | | 7/2017 | |
| CN | 206371611 | | 8/2017 | |
| CN | 107139933 | | 9/2017 | |
| CN | 107260139 | | 10/2017 | |
| CN | 105006103 | B | 4/2018 | |
| CN | 105841851 | | 8/2018 | |
| CN | 108900691 | | 11/2018 | |
| CN | 108926081 | | 12/2018 | |
| CN | 114074599 | A | 2/2022 | |
| DE | 102013012333999 | | 7/2013 | |
| DE | 102015006677 | | 11/2016 | |
| DE | 102019116618 | | 12/2020 | |
| EP | 1223191 | A1 | 7/2002 | |
| EP | 1384752 | A1 | 1/2004 | |
| EP | 2281205 | A1 | 2/2011 | |
| EP | 2375540 | A2 * | 10/2011 | H02J 7/855 |
| EP | 2581856 | | 4/2013 | |
| JP | 200879676 | | 4/2008 | |
| KR | 20110012229 | | 2/2011 | |
| KR | 20170013067 | | 2/2017 | |
| KR | 1020170087113 | | 7/2017 | |
| KR | 101835991 | B1 | 4/2018 | |
| WO | 2001017421 | | 3/2001 | |
| WO | 2005114476 | A1 | 12/2005 | |
| WO | 2005124594 | A1 | 12/2005 | |
| WO | 2008008714 | A1 | 1/2008 | |
| WO | 2011132009 | A2 | 4/2011 | |
| WO | 2015077418 | | 5/2015 | |
| WO | 2017136940 | | 8/2017 | |
| WO | 2018000396 | | 1/2018 | |
| WO | 2018048563 | A1 | 3/2018 | |
| WO | 2018154341 | | 8/2018 | |
| WO | 2018164632 | | 9/2018 | |
| WO | 2018204811 | | 11/2018 | |
| WO | 2019082095 | | 5/2019 | |
| WO | 2019140528 | | 7/2019 | |
| WO | 2019180626 | | 9/2019 | |

OTHER PUBLICATIONS

Mario, https://www.smartringnews.com/posts/smart-ring-vs-smartwatch-which-is-the-best-fitness-and-activity-tracker (2014) 2014.

Adafruit, p. 1-2, available at: https://www.adafruit.com/product/2806, published Jun. 2019. Jun. 2019.

Laput et al., "Skin buttons: cheap, small, low-powered and clickable fixed-icon laser projectors," UIST '14: Proceedings of the 27th Annual ACM Symposium on User Interface Software and Technology, pp. 389-394 Oct. 2014.

Google translation of KR20170087113A (Year: 2016) 2016.

"How to find your ideal bedtime with the Oura app", available online at <https://web_archive. org/web/20191206205332/https://ouraring.com/how-to-find-your-ideal-bedtime-with-the-oura-app/ 2019, 8 pages. 2019.

"Vauxhall/Opel In-Car Wireless Charging", retrieved from <https://www.air-charge.com/aircharge-for-business/automotive/vauxhall-wireless- charging>, Oct. 2019, 4 pages. Oct. 2019.

"Wireless charging for smart ring/pointing devices" available online at <http://www.humavox.comismt_product/wireless-charging-for-smart-ringpointing-devices/>, Oct. 2019, 3 pages Oct. 2019.

(56) References Cited

OTHER PUBLICATIONS

ASU projection wearable: Live tomorrow today (world first launch @ CES 2016). (Dec. 2015). ASU Tech, YouTube. Retrieved from https://www.youtube.com/watch?v=Wdb5OD7Y0Y. 2015.

Brownell, L., "Low-cost wearables manufactured by hybrid 3D printing. Wyss Institute, Harvard," Retrieved from https://wyss.harvard.edu/news/low-cost-wearables-manufactore-by-hybrid-3d-priniting/, Sep. 6, 2017, pp. 11 Sep. 6, 2017.

Cetin, C., "Design, testing and implementation of a new authentication method using multiple devices," Graduate Theses and Dissertations, University of South Florida Scholar Commons. Retrieved from https://scholarcommons.usf.edu/etd/5660, Jan. 2015, pp 61 Jan. 2015.

Charles Q. Choi, "Low Battery? New Tech Lets You Wirelessly Share Power", available online at <https://www.livescience.com/54790-new-tech-enables-wireless-charging.html>, May 19, 2016, 9 pages. May 19, 2016.

Chen, X.A., et al., "Encore: 3D printed augmentation of everyday objects with printed-over, affixed and interlocked attachments," Nov. 5, 2015, pp. 73-82 Nov. 5, 2015.

Chen, X. A., et al., "Reprise: A design tool for specifying, generating, and customizing 3D printable adaptations on everyday objects," Oct. 16, 2016, pp. 29-39 Oct. 16, 2016.

E-Senses, "Personal vitamin D, sunlight and daylight coach", available online at <https://e-senses.com/>, 2019, 5 pages. 2019.

Hipolite, W., "The 3D printed O Bluetooth Ring is one of the tiniest personal computers you will ever see," 3DPrint.com. Retrieved from https://3dprint.com/34627/o-bluetooth-ring-3d-printed/. Jan. 2015, pp. 5 Jan. 2015.

Hussain Almossawi, "This smart ring aims to provide better lives for people with sickle cell disease", retrieved from https://www.core77.com/projects/82131/This-Smart-Ring-Aims-to-Provide-Better-Lives-for-People-with-Sickle-Cell-2021, 9 pages. 2021.

Je et al., "PokeRing: Notifications by poking around finger", Proceedings of the 2018 CHI Conference on Human Factors in Computing Systems—CHI'18, 2018, paper 542, pp. 1-10. 2018.

Katharine Schwab, "Orii, the ring that turns your finger into a phone, is here", available online at <https://www.fastcompany.com/90399237/orii-the-ring-that-turns-your-finger-into-a-phone-is-here>, 2019, 4 pages. 2019.

Magno et al., "Self-sustainable smart ring for long-term monitoring of blood oxygenation", IEEE Access, 2019, pp. 115400-115408 2019.

Mahmud et al., Wearable technology for drug abuse detection: A survey of recent advancements, Smart Health, vol. 13, Aug. 2019, 100062 Aug. 2019.

Margaret, "The Orb: A Bluetooth headset that turns into a ring", Gadgets, BornRich, Jun. 2013, available online at <https://www.bornrich.com/the-orb-a-bluetooth-headset-that-turns-into-a-ring.html> Jun. 2013.

Nassi et al., "Virtual breathalyzer", Department pf Software and Information Systems Engineering, Ben-Gurion University of the Negev, Israel, 2016, 10 pages. 2016.

Neev Kiran, "SkinnySensor: Enabling Battery-Less Wearable Sensors Via Intrabody Power Transfer", Master Theses 694, University of Massachusetts Amherst, 2018, 63 pages. 2018.

Nerd-Fu, "Push present", Delicious Juice Dot Com, Apr. 2015, available online at <https://blog. deliciousjuice.com/2015/04/>. Apr. 2015.

Pablo E. Suarez, "NXT Ring—Your Digital-self at Hand", available online at <https://www.youtube.com/watch?v=9w7uxDHs7NY>, uploaded on Jun. 21, 2019, 2 pages. Jun. 21, 2019.

Roumen et al., "NotiRing: A comparative study of notification channels for wearable interactive rings", Proceedings of the 33rd Annual ACM Conference on Human Factors in Computing Systems—CHI'15, 2015, pp. 2497-2500. 2015.

Sarah Jacobson Purewell, "Ringly review: The smart ring that be sexier", available online at <https://www.macworld.com/article/227133/ringly-review-the-smart-ring-that-could-be-sexier.html>, 2016, 10 pages. 2016.

Schwab, K., "This startup wants to kill passwords-a-replace them with jewelry. Fast Company," Retrieved from https://www.fastcompany.com/90254843/this-startup-wants-to-kill-passwords-and-replace-them-with-jewelry, (Oct. 2018), pp. 7 Oct. 2018.

Seung et al., "Nanopatterned Textile-Based Wearable Triboelectric Nanogenerator", ACS Nano, vol. 9, 2015, pp. 3501-3509. 2015.

Shane McGlaun, "Geek builds Bluetooth Smart Ring with OLED display", available online at <https://www.slashgear.com/geek-build-bluetooth-smart-ring-with-oled-display-02361383/>, 2015, 6 pages. 2015.

Sperlazza, "We tested four sleep trackers apps and wearables: Here are the best ones", available online at <https://www.bulletproof.com/sleep/tech/best-sleep-tracker-apps/>, 2019, 18 pages. 2019.

Turunen, "Smart ring for stress control and self-understanding", available online at <https://slowfinland.fi/en/smart-ring-for-stress-control-and-understanding/>, 2017, 9 pages. 2017.

Wochit Tech. (2017) New smart monitors UV exposure [Video file]. Retrieved from https://www.youtube.com/watch?v=4YvkioTZxjU, 3 pages. 2017.

Worgan et al., "Garment level power distribution for wearables using inductive power transfer," 9th International Conference on Human System Interactions (HSI), 2016, pp. 277-283 2016.

Xiao et al., "LumiWatch: On-arm projected graphics and touch input," Proceedings of the 2018 CHI Conference on Human Factors in Computing Systems—CHI'18, 2018, pp. 1-11 2018.

Zhu et al., "Developing a driving fatigue detection system using physiological sensors," Proceedings of the 29th Australian Conference on Computer-Human Interaction—OZCHI'17, 2017, pp. 566-570 2017.

Zhu, M., et al., "Fluidic fabric muscle sheets for wearable and soft robotics," Retrieved from https://arxiv.org/pdf/1903.08253.pdf, Mar. 2019, pp. 32 Mar. 2019.

"The Oura App | Oura Ring", available online at <https://web.archive.org/web/20191019192921/https://ouraring.com/ introducing-the-new-oura-app/>, 6 pages. Oct. 29, 2019.

"Get the Technical Specs of Oura Ring | Oura Ring", available online at <https://web.archive.org/web/20191129014439/https://ouraring.com/tech-specs/>, 3 pages Jan. 29, 2019.

"Learn how the Oura ring works | Go inside | Oura Ring", available online at <https://web.archive.org/web/20181127193557/https://ouraring.com/how-oura-works/>, 5 pages Nov. 27, 2018.

Oura Ring Generation 1 User Manual, available online at < https://fccid.io/2AD7V-OURARING15001/User-Manual/User-Manual-2844448.pdf>, 8 pages Nov. 24, 2015.

Oura Ring Generation 2 User Manual, available online at < https://fccid.io/2AD7V-OURA1801/User-Manual/User-manual-v2-3856414.pdf>, 13 pages Mar. 27, 2018.

Oura ring. Improve sleep. Perform better. by OURA—Kickstarter, available online at <https://web.archive.org/web/20160427015852/https://www.kickstarter.com/projects/oura/oura-ring-improve-sleep-perform-better/description>, 27 pages Apr. 27, 2016.

OURA Ring review—The Gadgeteer, available online at < https://the-gadgeteer.com/2017/08/11/oura-ring-review/> 16 pages Aug. 11, 2017.

Ouraring.com JZ50-0112 user manual available with Gen 2 ring purchase, 2 pages.

Important Information Please Read JZ50-0148 user manual available with gen 2 ring purchase, 4 pages May 13, 2019.

Important Information Please Read JZ50-0149 user manual available with gen 2 ring purchase, 4 pages May 13, 2019.

Oura Ring | Sleep Tracker and Smart Ring with a Heart Rate Monitor, available online at <https://web.archive.org/web/20180709050831/https://ouraring.com/>, 12 pages Jul. 9, 2018.

Introducing the New Oura Ring Generation 3—The Pulse Blog, available online at <https://ouraring.com/blog/oura-generation2-vs-generation3/>, 3 pages Oct. 26, 2021.

Oura Ring 2 Teardown: Inside the NBA's COVID-19-Detecting Smart Ring, available at < https://www.youtube.com/watch?v=BwA1hmSVgVY> (Script) Jul. 9, 2020.

Trigueiros et al., (2019). A comparison of machine learning algorithms applied to hand gesture recognition. 2019.

Smiley, S., Active RFID vs. Passive RFID: What's the Difference? https://www.atlasrfidstore.com/rfid-insider/active-rfid-vs-passive-

(56) References Cited

OTHER PUBLICATIONS rfid/?srsltid= AfmBOoqhNhYwPPUSENIXB8LarZMm3TVQ4ugn4nTNUhfpy-9yYC_j0wdm Mar. 2016.
Lawton, G., (2022). Active vs. passive RFID tags: Which to choose: TechTarget. Retrieved from: https://www.techtarget.com/searcherp/tip/Active-vs-passive-RFID-tags-Which-to-choose Nov. 2022.
Amma et al., (2010). Airwriting recognition using wearable motion sensors. ACM International Conference Proceeding Series. 10. 10.1145/1785455.1785465. 2010.
Zhou et al., (2012). Analysis and Selection of Features for Gesture Recognition Based on a Micro Wearable Device. International Journal of Advanced Computer Science and Applications. 3. 10.14569/IJACSA.2012.030101. 2012.
Castaneda et al., (2018), Int J Biosens Biolectron. 2018, "A review on wearable photoplethysmography sensors and their potential future applications in health care"; 4(4):195-202. doi:10.15406/ijbsbe.2018.04.00125. 2018.
Rhee et al., (2001). Artifact-resistant power-efficient design of finger-ring plethysmographic sensors. IEEE transactions on biomedical engineering. 48. 795-805. 10.1109/10.930904. 2001.
Rhee et al., (2000). Artifact-resistant, power-efficient design of finger-ring plethysmographic sensors. Part II. Prototyping and benchmarking. 4. 2796-2799 vol. 4. 10.1109/IEMBS.2000.901444. 2000.
Ying et al., (2007). Automatic Step Detection in the Accelerometer Signal. 10.1007/978-3-540-70994-7_14. 2007.
Mendelson et al., (2006). A Wearable Reflectance Pulse Oximeter for Remote Physiological Monitoring. Conference proceedings : . . . Annual International Conference of the IEEE Engineering in Medicine and Biology Society. IEEE Engineering in Medicine and Biology Society. Conference. 1. 912-5. 10.1109/IEMBS.2006.260137. 2006.
100 Best Inventions of 2020 https://time.com/collection/best-inventions-2020/ 2020.
Clark, B. A.. "Color in Sunglass Lenses*." Optometry and Vision Science 46 (1969): 825-840. 1969.
Webster, J.G., Design of pulse oximeters Webster—Institute of Physics Publishing—2003 2003.
Dynamic drinkware-type analysis for mestas.
Park et al., (2011). E-gesture: A collaborative architecture for energy-efficient gesture recognition with hand-worn sensor and mobile devices. SenSys 2011—Proceedings of the 9th ACM Conference on Embedded Networked Sensor Systems. 359-360. 10.1145/1999995.2000034. 2011.
Teh et al., (2000). Embedding of electronics within thermoplastic polymers using injection moulding technique. Filtration Industry Analyst. 10-18. 10.1109/IEMT.2000.910703. 2000.
Sakai, Tadamoto. (1993). Encapsulation process for electronic devices using injection molding method. Advances in Polymer Technology. 12. 61-71. 10.1002/adv.1993.060120106. 1993.
Au, Lawrence et al., (2009). Episodic Sampling: Towards Energy-efficient Patient Monitoring with Wearable Sensors. Conference proceedings : . . . Annual International Conference of the IEEE Engineering in Medicine and Biology Society. IEEE Engineering in Medicine and Biology Society. Conference. 2009. 6901-5. 10.1109/IEMBS.2009.5333615. 2009.
Silverman, A. (2002). Fifty Years of Glass-Making. Industrial & Engineering Chemistry. 18. 10.1021/ie50201a004. 2002.
Petropoulos et al., (2012). Flexible PCB-MEMS flow sensor. Procedia Engineering. 47. 236-239. 10.1016/j.proeng.2012.09.127. 2012.
Schlömer et al., (2008). Gesture Recognition with a Wii Controller. First publ. in: Proceedings of the 2nd International Conference on Tangible and Embedded Interaction 2008, Bonn, Germany, Feb. 18-20, 2008, pp. 11-14. 10.1145/1347390.1347395. 2008.
Rekimoto, J. (2001). GestureWrist and GesturePad: unobtrusive wearable interactiondevices. International Symposium on Wearable Computers, Digest of Papers. 21-27. 10.1109/ISWC.2001.962092. 2001.
Guidelines to Enhancing the Heart-Rate Monitoring Performance of Biosensing Wearables https://www.analog.com/en/resources/technical-articles/guidelines-to-enhancing-the-heartrate-monitoring-performance-of-biosensing-wearables.html 2019.
Krzyanowski, J. "How are PCB's made? A Beginner's Guide to the PCB Manufacturing Process" Retrieved from Knowledge zone https://vectorbluehub.com/how-are-pcbs-made 2023.
Ciofu, et al., (2013) Injection and Micro Injection of Polymeric . . . First edition of the International Scientific Conference Modern Technologies in Machine Manufacturing Technology TMCM ISSN 2067-3604, vol. V, No. 1/2013https://modtech. ro/international-journal/vol5no12013/Ciofu_Ciprian_1.pdf 2013.
Ross, R.J.. (2004). LCP injection molded packages—keys to JEDEC 1 performance. 1807-1811 vol.2. 10.1109/ECTC.2004.1320364. 2004.
Murphy, K. (2012) Machine learning: a probabilistic perspective 2012.
Olofson et al., Machining of titanium alloys—Battelle Memorial Institute, Defense Metals Information Center—1965 1965.
Asada et al., "Mobile monitoring with wearable photoplethysmographic biosensors," in IEEE Engineering in Medicine and Biology Magazine, vol. 22, No. 3, pp. 28-40, May-Jun. 2003, doi: 10.1109/MEMB.2003.1213624 2003.
Chen et al., (2009). Monitoring Human Movements at Home Using Wearable Wireless Sensors. Engineering Faculty Presentations. 2009.
On the Heels of 1 Million Rings Sold, Oura Now Valued at $2.55 Billion https://www.businesswire.com/news/home/20220405006108/en/On-the-Heels-of-1-Million-Rings-Sold-Oura-Now-Valued-at-2.55-Billion#:~:text=SAN%20FRANCISCO%2D%2D(BUSINESS%20WIRE,of%20selling%201%2C000%2C000%20Oura%20Rings. Apr. 2022.
Lister et al., (2018) Optical properties of human skin https://www.spiedigitallibrary.org/journals/journal-of-biomedical-optics/volume-17/issue-9/090901/Optical-properties-of-human-skin/10.1117/1.JBO.17.9.090901.full 2018.
Uchino et al., (2000). Prediction of Optical Properties of Commercial Soda-Lime-Silicate Glasses Containing Iron. Journal of Non-Crystalline Solids. 261. 72-78. 10.1016/S0022-3093(99)00617-1. 2000.
Lawrence et al., (1989) "Pulse Oximetry" Anesthesiology: The journal of the American Society Of Anesthesiologists, Inc. vol. 70 No. 1 1989.
Konig et al., (1998) "Reflectance Pulse Oximetry-Principles and obstetric application in the zurich system" Journal of Clinical Monitoring and Computing vol. 14 No. 6PG. 3-6 1998.
Rhee et al., (2000). Artifact-resistant, power-efficient design of finger-ring plethysmographic sensors. Part I. Design and analysis. 4. 2792-2795 vol. 4. 10.1109/IEMBS.2000.901443. 2000.
Rhee, Sokwoo. (2006). Design and analysis of artifact-resistive finger photoplethysmographic sensors for vital sign monitoring /. 2006.
Hill et al., (2024) The Best Smart Ring To Rule Them All Retrieved from: https://www.wired.com/gallery/best-smart-rings/ 2024.
Kaltenbach, F. (2004). Translucent Materials: Glass, Plastics, Metals 2004.
Liu et al., (2009). UWave: Accelerometer-based personalized gesture recognition and its applications. Pervasive and Mobile Computing. 5. 657-675. 10.1016/j.pmcj.2009.07.007. 2009.
Zhu et al., (2011). Wearable Sensor-Based Hand Gesture and Daily Activity Recognition for Robot-Assisted Living. IEEE Transactions on Systems, Man, and Cybernetics, Part A. 41. 569-573. 10.1109/TSMCA.2010.2093883. 2011.
Stables et al., (2022). Why the Oura Ring Gen 3 was our wearable of the year. Retrieved from: https://www.wareable.com/wearable-tech/why-the-oura-ring-3-was-our-wearable-of-the-year-2022 2022.
Sun et al., (2013). Wireless Power Transfer for Medical Microsystems. 10.1007/978-1-4614-7702-0. 2013.
U.S. Appl. No. 61/768,279 2013.
Ardebili et al.—William Andrew—2019. Encapsulation technologies for electronic applications 2019.
Sleep Lab validation of a wellness ring detecting sleep patterns based on photoplethysmogram, actigraphy and body temperature published Feb. 9, 2016, to Kinnunen (Year: 2016) 2016.

(56) References Cited

OTHER PUBLICATIONS adafruit.com, “RFID/NFC Smart Ring—Size 12—NTAG213,” accessed at https://web.archive.org/web/20190605061438/https://www.adafruit.com/product/2806, publication Jun. 5, 2019 Jun. 5, 2019.

Oura Ring 2 Teardown: Inside the NBA’s COVID-19-Detecting Smart Ring, available at < https://www.youtube.com/watch?v=BwA1hmSVgVY> (Screenshots)) Jul. 9, 2020.

* cited by examiner

ENVIRONMENT-INTEGRATED SMART RING CHARGER

CROSS-REFERENCES TO RELATED APPLICATIONS

This application is a continuation of U.S. Non-Provisional patent application Ser. No. 19/189,734, filed on Apr. 25, 2025, which is a continuation of U.S. Non-Provisional patent application Ser. No. 18/975,246, filed on Dec. 10, 2024, which is a continuation of U.S. Non-Provisional patent application Ser. No. 18/234,180, filed on Aug. 15, 2023, which is a continuation of U.S. Non-Provisional patent application Ser. No. 17/937,576, filed Oct. 3, 2022, which is a continuation of U.S. Non-Provisional application Ser. No. 16/929,641, filed Jul. 15, 2020, which claims the benefit of U.S. Provisional Patent Application No. 62/877,391, filed on Jul. 23, 2019, and U.S. Provisional Patent Application No. 62/990,123, filed Mar. 16, 2020, all of which are incorporated by reference herein in their entirety for all purposes.

FIELD OF THE DISCLOSURE

The present disclosure generally relates to smart ring wearable devices and, more specifically, to systems for charging smart ring devices with chargers integrated into objects in the environment for enabling charging when a user holds an object with an integrated charger while wearing the smart ring.

BACKGROUND

To the extent that smart ring technology has been adopted, it has a number of challenges. For example, a number of problems exist with wearable devices generally, including: they often need to be removed for charging; they often have poor fit; they often provide relatively little user interactivity; and they often provide limited functionality.

BRIEF SUMMARY

A smart ring charging system may be configured to transfer energy between a charging source outside of the ring housing and the power source of the smart ring disposed at the ring housing. The charging source may be disposed at an object that a user can grasp or hold. The charging may be initiated when the user holds the object with the charging source. A user interface of the charging system may include one or more indicators configured to indicate the charging rate of the power source disposed at the smart ring, at the object with the integrated charging source, or at another suitable location. The indicators may provide audio, visual, or haptic output indicative of the charging system operation. The energy transfer between the charging source and the power source may be wireless and may use inductive coupling. To that end, the smart ring may include a receiving induction coil configured to generate a voltage in response to a change in magnetic flux through the coil, the magnetic flux associated with one or more transmitting coils electrically connected to the charging source.

In one aspect, a smart ring charging system comprises a charging source integrated into an object, the object configured to be held by a user wearing a smart ring. The system further comprises the smart ring including: (i) a ring-shaped housing; (ii) a power source, disposed within or at the ring-shaped housing and configured to receive energy from the charging source while the user is wearing the smart ring and holding the object with the charging source; (iii) a controller, disposed within or at the ring-shaped housing and configured to estimate a charging rate at which the power source receives energy from the charging source; and (iv) one or more input/output (I/O) components, including a user interface disposed within or at the ring-shaped housing and configured to indicate when the charging rate is above a threshold.

In another aspect, a method for charging a smart ring comprises: integrating a charging source into an object, the object configured to be held by a user wearing a smart ring; transmitting, by the charging source, energy for charging a power source disposed within the smart ring; and receiving, by the power source disposed within the smart ring, the energy transmitted by the charging source while the user is wearing the smart ring and holding the object with the integrated charging source. The method further comprises: detecting, by a controller, that a charging rate at which the power source is receiving the energy from the charging source is above a threshold; and indicating, by a user interface, the charging rate in response to detecting that the charging rate is above the threshold.

Still, in another aspect, a smart ring charging system comprises a charging source integrated into an object, the object configured to be held by a user wearing a smart ring. The charging system also comprises the smart ring including: (i) a ring-shaped housing; (ii) a power source, disposed within or at the ring-shaped housing and configured to receive energy from the charging source while the user is wearing the smart ring and holding the object with the charging source; (iii) a controller, disposed within or at the ring-shaped housing and configured to estimate a charging rate at which the power source receives energy from the charging source; and (iv) one or more input/output (I/O) components, including a transmitter disposed within or at the ring-shaped housing and configured to transmit a signal indicative of the estimated charging rate. Furthermore, the system comprises one or more indicators disposed outside of the smart ring and configured to indicate the charging rate in response to the transmitted signal.

In yet another aspect, a smart ring charging system comprises a charging source integrated into an object, the object configured to be held by a user wearing a smart ring; a controller, disposed within or at the object with the charging source and configured to estimate a charging rate at which the power source receives energy from the charging source; and one or more indicators disposed within or at the object with the charging source and configured to indicate the charging rate. The system further comprises the smart ring including: (i) a ring-shaped housing; and (ii) a power source, disposed within or at the ring-shaped housing and configured to receive energy from the charging source while the user is wearing the smart ring and holding the object with the charging source.

In another embodiment, a ring includes a controller. The ring can also include a power source configured to power the controller. The ring further can include a charging unit. The charging unit can be configured to convert a first form of energy into a second form of energy. The charging unit also can be coupled to the power source to provide the second form of energy to the power source. The controller can execute instructions to control operation of a user interface.

In another embodiment, a method for charging a ring can include providing, by a power source, energy to a controller. The method for charging a ring also can include converting, by a charging unit, a first form of energy into a second form of energy. The charging unit can be coupled to the power source. The method for charging a ring also can include providing, by the charging unit, the second form of energy to the power source. The method for charging a ring also can include controlling, by the controller, operation of a user interface.

In another embodiment, a method of providing a ring can include providing a controller. The method of providing a ring also can include providing a power source configured to power the controller. The method of providing a ring further can include providing a charging unit configured to convert a first form of energy into a second form of energy. The charging can be coupled to the power source to provide the second form of energy to the power source. The controller can execute instructions to control operation of a user interface.

In another embodiment, a charging system can include a housing. The housing can include a controller. The housing also can include a power source configured to power the controller. The charging system also can include a wireless charger configured to transfer energy to the power source. The wireless charger can include a first indicator. The first indicator can be configured to provide a first non-flashing visual output at a first brightness level and indicative of a first charging status of the power source. The first indicator also can be configured to provide a second non-flashing visual output at a second brightness level indicative of a second charging status of the power source.

In another embodiment, a method for charging a housing can include providing the housing. Providing the housing can include providing a controller. Providing the housing also can include providing a power source configured to power the controller. The method for charging a housing further can include providing a wireless charger configured to transfer energy to the power source. Providing the wireless charger can include providing a first indicator. Providing the first indicator can include providing a first non-flashing visual output at a first brightness level and indicative of a first charging status of the power source. Providing the first indicator also can include providing a second non-flashing visual output at a second brightness level indicative of a second charging status of the power source.

In another embodiment, a charging system can include a housing. The housing can include a controller and at least one sensor. The housing also can include a power source configured to power the controller. The charging system also can include a wireless charger configured to transfer energy to the power source. The wireless charger can include a first indicator. The first indicator can be configured to provide a first non-flashing visual output at a first brightness level and indicative of a first charging status of the power source. The first indicator also can be configured to provide a second non-flashing visual output at a second brightness level indicative of a second charging status of the power source.

In another embodiment, a charging system can include a housing. The housing can include a controller. The housing also can include a power source configured to power the controller. The charging system also can include a wireless charger configured to transfer energy to the power source. The wireless charger can include a first non-flashing visual output at a first brightness. The wireless charger also can include a second non-flashing visual output at a second brightness.

In another embodiment, a method for charging a housing can include providing a housing. The providing the housing can include providing a controller. The providing the housing also can include providing a power source configured to power the controller. The method for charging the housing also can include providing a wireless charger configured to transfer energy to the power source. The wireless charger can provide a first non-flashing visual output at a first brightness. The wireless charger also can provide a second non-flashing visual output at a second brightness.

In another embodiment, a charging system can include a housing. The housing can include a controller and at least one sensor. The housing also can include a power source configured to power the controller. The charging system also can include a wireless charger configured to transfer energy to the power source. The wireless charger can provide a first non-flashing visual output at a first brightness. The wireless charger also can provide a second non-flashing visual output at a second brightness.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION

Smart ring wearable technology can enable a wide range of applications including security, safety, health and wellness, and convenient interfacing between a user and a variety of technologies based at least in part upon integrating a variety of sensor, input/output devices, and computing capabilities in a compact form factor. One of the challenges in increasing smart ring capabilities is reliably powering the needed components, particularly considering the limited space for a power source in the compact form factor. An ability to conveniently charge a power source of a smart ring without removing the smart ring from a finger would contribute to the adoption of smart ring technology.

One way to charge a smart ring without removing the smart ring from the finger may include using a charger disposed in the environment of the smart ring. For example, the charger may be integrated into an object that a user may hold or grasp while a wearing a smart ring in a manner that allows a power source of the smart ring to charge. For the purposes of charging, the charger may connect to the smart ring worn by the user by a cable or via a socket. Additionally or alternatively, the smart ring and the charger may be configured for wireless energy transfer. Some wireless energy transfer techniques may rely on generated variable electromagnetic fields at a charging source that may couple a portion of the generated energy to the power source of the smart ring. To that end, the charging source and the smart ring may include inductively coupled coils—a transmitting coil at the charging source and a receiving coil at the ring.

Various techniques, systems, and methods for charging a power source of a smart ring using charging sources integrated into objects in the environment of the smart ring are discussed below with reference to FIG. 1, FIG. 2, FIG. 3, FIG. 4, FIG. 5A, FIG. 5B, and FIG. 5C. In section I, a smart ring and environment-integrated charging system is described with reference to FIG. 1. In section II, example smart ring form factor types and configurations to facilitate connections to an integrated charging source are discussed with reference to FIG. 2 and FIG. 3. In section III, an example operating environment in which a smart ring and the charging system may operate is described with reference to FIG. 4. In section IV, example schematics for a charging system with an environment-integrated charging source are described with reference to FIG. 5A, FIG. 5B, and FIG. 5C. In section V, other considerations are described.

I. EXAMPLES OF SMART RING AND SMART RING COMPONENTS

Figure 1:
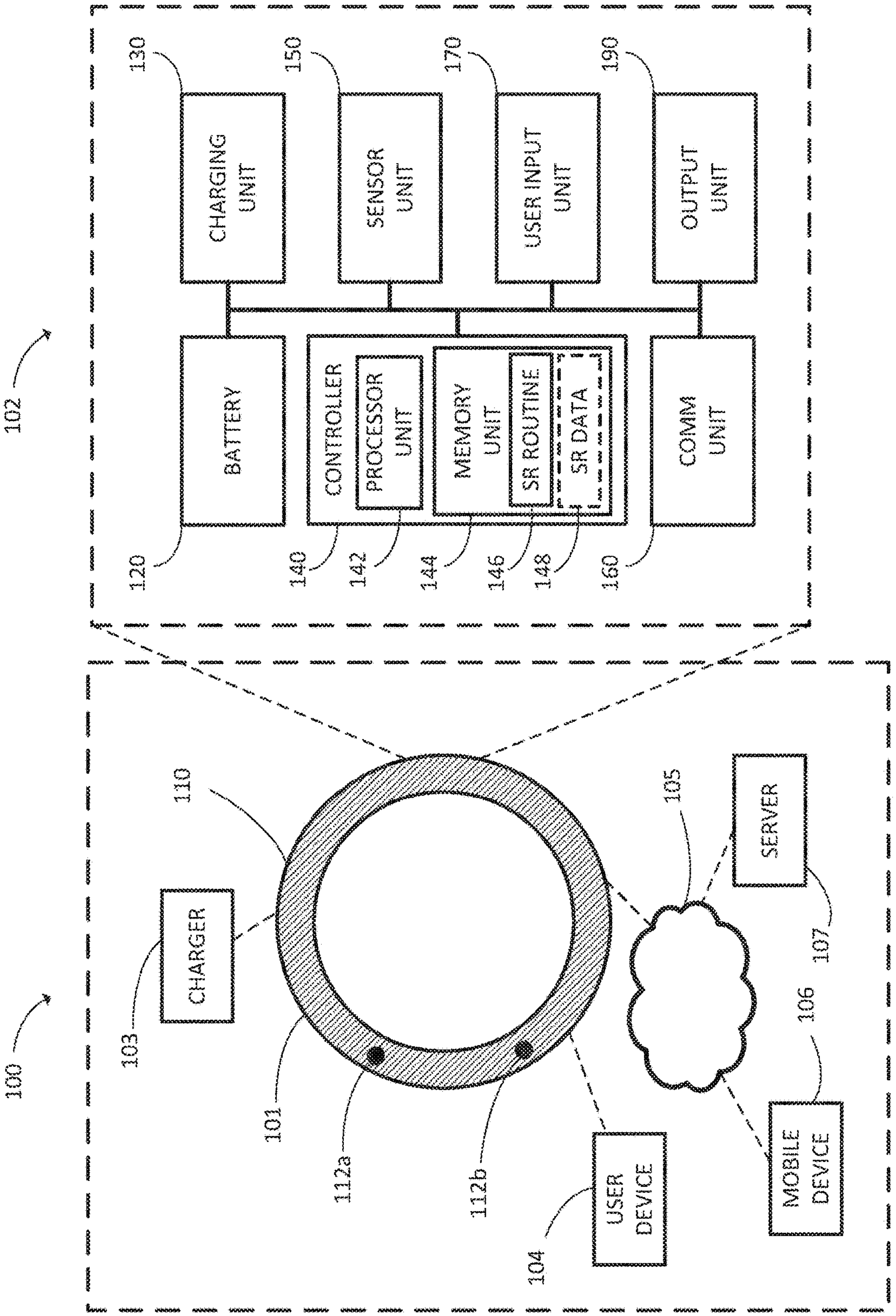
FIG. 1 illustrates a system comprising a smart ring and a block diagram of smart ring components according to some embodiments.

FIG. 1 illustrates a system 100 comprising a smart ring 101 that may be charged via a charging system according to one or more of the techniques described herein. FIG. 1 also shows one or more devices or systems that may be electrically, mechanically, or communicatively connected to the smart ring 101. As shown, the smart ring 101 may include a set of components 102, which may have various power needs and may impact the frequency with which the smart ring 101 needs recharging. Some of the components 102 may interact, as described below, with the components of the charging system disposed outside of the smart ring. Furthermore, in implementations where the charging system uses wireless transfer of electromagnetic energy between the charging source and the smart ring, the components 102 may be configured to be compatible with the electromagnetic fields to which the components 102 may be exposed during charging.

The system 100 may comprise any one or more of: a charger 103 for the smart ring 101, a user device 104, a network 105, a mobile device 106, or a server 107. The charger 103 may provide energy to the smart ring 101 by way of a direct electrical, a wireless, or an optical connection. The smart ring 101 may be in a direct communicative connection with the user device 104, the mobile device 106, or the server 107 by way of the network 105. Interactions between the smart ring 101 and other components of the system 100 are discussed in more detail in the context of FIG. 4.

The smart ring 101 may sense a variety of signals indicative of activities of a user wearing the ring 101, biometric signals, a physiological state of the user, or signals indicative of the user's environment. The smart ring 101 may analyze the sensed signals using built-in computing capabilities or in cooperation with other computing devices (e.g., user device 104, mobile device 106, server 107) and provide feedback to the user or about the user via the smart ring 101 or other devices (e.g., user device 104, mobile device 106, server 107). Additionally or alternatively, the smart ring 101 may provide the user with notifications sent by other devices, enable secure access to locations or information, or a variety of other applications pertaining to health, wellness, productivity, or entertainment.

The smart ring 101, which may be referred to herein as the ring 101, may comprise a variety of mechanical, electrical, optical, or any other suitable subsystems, devices, components, or parts disposed within, at, throughout, or in mechanical connection to a housing 110 (which may be ring shaped and generally configured to be worn on a finger). Additionally, a set of interface components 112*a* and 112*b* may be disposed at the housing, and, in particular, through the surface of the housing. The interface components 112*a* and 112*b* may provide a physical access (e.g., electrical, fluidic, mechanical, or optical) to the components disposed within the housing. The interface components 112*a* and 112*b* may exemplify surface elements disposed at the housing. As discussed below, some of the surface elements of the housing may also be parts of the smart ring components.

As shown in FIG. 1, the components 102 of the smart ring 101 may be distributed within, throughout, or on the housing 110. As discussed in the contexts of FIG. 2 and FIG. 3 below, the housing 110 may be configured in a variety of ways and include multiple parts. The smart ring components 102 may, for example, be distributed among the different parts of the housing 110, as described below, and may include surface elements of the housing 110. The housing 110 may include mechanical, electrical, optical, or any other suitable subsystems, devices, components, or parts disposed within or in mechanical connection to the housing 110, including a battery 120 as a power source, a charging unit 130, a controller 140, a sensor system 150 comprising one or more sensors, a communications unit 160, a one or more user input devices 170, or a one or more output devices 190. Each of the components 120, 130, 140, 150, 160, 170, and/or 190 may include one or more associated circuits, as well as packaging elements. The components 120, 130, 140, 150, 160, 170, and/or 190 may be electrically or communicatively connected with each other (e.g., via one or more busses or links, power lines, etc.), and may cooperate to enable "smart" functionality described within this disclosure.

The battery 120 may supply energy or power to the controller 140, the sensors 150, the communications unit 160, the user input devices 170, or the output devices 190. In some scenarios or implementations, the battery 120 may supply energy or power to the charging unit 130. The charging unit 130, may supply energy or power to the battery 120. In some implementations, the charging unit 130 may supply (e.g., from the charger 103, or harvested from other sources) energy or power to the controller 140, the sensors 150, the communications unit 160, the user input devices 170, or the output devices 190. In a charging mode of operation of the smart ring 101, the average power supplied by the charging unit 130 to the battery 120 may exceed the average power supplied by the battery 120 to the charging unit 130, resulting in a net transfer of energy from the charging unit 130 to the battery 120. In a non-charging mode of operation, the charging unit 130 may, on average, draw energy from the battery 120.

The battery 120 may include one or more cells that convert chemical, thermal, nuclear or another suitable form of energy into electrical energy to power other components or subsystems 140, 150, 160, 170, and/or 190 of the smart ring 101. The battery 120 may include one or more alkaline, lithium, lithium-ion and or other suitable cells. The battery 120 may include two terminals that, in operation, maintain a substantially fixed voltage of 1.5, 3, 4.5, 6, 9, 12 V or any other suitable terminal voltage between them. When fully charged, the battery 120 may be capable of delivering to power-sinking components an amount of charge, referred to herein as "full charge," without recharging. The full charge of the battery may be 1, 2, 5, 10, 20, 50, 100, 200, 500, 1000, 2000, 5000 mAh or any other suitable charge that can be delivered to one or more power-consuming loads as electrical current.

The battery 120 may include a charge-storage device, such as, for example a capacitor or a super-capacitor. In some implementations discussed below, the battery 120 may be entirely composed of one or more capacitive or charge-storage elements. The charge storage device may be capable of delivering higher currents than the energy-conversion cells included in the battery 120. Furthermore, the charge storage device may maintain voltage available to the components or subsystems 130, 140, 150, 160, 170, and/or 190 when one or more cells of the battery 120 are removed to be subsequently replaced by other cells.

The charging unit 130 may be configured to replenish the charge supplied by the battery 120 to power-sinking components or subsystems (e.g., one or more of subsystems 130, 140, 150, 160, 170, and/or 190) or, more specifically, by their associated circuits. To replenish the battery charge, the charging unit 130 may convert one form of electrical energy into another form of electrical energy. More specifically, the charging unit 130 may convert alternating current (AC) to direct current (DC), may perform frequency conversions of current or voltage waveforms, or may convert energy stored in static electric fields or static magnetic fields into direct current. Additionally or alternatively, the charging unit 130 may harvest energy from radiating or evanescent electromagnetic fields (including optical radiation) and convert it into the charge stored in the battery 120. Furthermore, the charging unit 130 may convert non-electrical energy into electrical energy. For example, the charging unit 130 may harvest energy from motion, or from thermal gradients.

The controller 140 may include a processor unit 142 and a memory unit 144. The processor unit 142 may include one or more processors, such as a microprocessor (uP), a digital signal processor (DSP), a central processing unit (CPU), a graphical processing unit (GPU), a field-programmable gate array (FPGA), an application-specific integrated circuit (ASIC), or any other suitable electronic processing components. Additionally or alternatively, the processor unit 142 may include photonic processing components.

The memory unit 144 may include one or more computer memory devices or components, such as one or more registers, RAM, ROM, EEPROM, or on-board flash memory. The memory unit 144 may use magnetic, optical, electronic, spintronic, or any other suitable storage technology. In some implementations, at least some of the functionality the memory unit 144 may be integrated in an ASIC or and FPGA. Furthermore, the memory unit 144 may be integrated into the same chip as the processor unit 142 and the chip, in some implementations, may be an ASIC or an FPGA.

The memory unit 144 may store a smart ring (SR) routine 146 with a set of instructions, that, when executed by the processor 142 may enable the operation and the functionality described in more detail below. Furthermore, the memory unit 144 may store smart ring (SR) data 148, which may include (i) input data used by one or more of the components 102 (e.g., by the controller when implementing the SR routine 146) or (ii) output data generated by one or more of the components 102 (e.g., the controller 140, the sensor unit 150, the communication unit 160, or the user input unit 170). In some implementations, other units, components, or devices may generate data (e.g., diagnostic data) for storing in the memory unit 144.

The processing unit 142 may draw power from the battery 120 (or directly from the charging unit 130) to read from the memory unit 144 and to execute instructions contained in the smart ring routine 146. Likewise, the memory unit 144 may draw power from the battery 120 (or directly from the charging unit 130) to maintain the stored data or to enable reading or writing data into the memory unit 144. The processor unit 142, the memory unit 144, or the controller 140 as a whole may be capable of operating in one or more low-power mode. One such low power mode may maintain the machine state of the controller 140 when less than a threshold power is available from the battery 120 or during a charging operation in which one or more battery cells are exchanged.

The controller 140 may receive and process data from the sensors 150, the communications unit 160, or the user input devices 170. The controller 140 may perform computations to generate new data, signals, or information. The controller 140 may send data from the memory unit 144 or the generated data to the communication unit 160 or the output devices 190. The electrical signals or waveforms generated by the controller 140 may include digital or analog signals or waveforms. The controller 140 may include electrical or electronic circuits for detecting, transforming (e.g., linearly or non-linearly filtering, amplifying, attenuating), or converting (e.g., digital to analog, analog to digital, rectifying, changing frequency) of analog or digital electrical signals or waveforms.

The sensor unit 150 may include one or more sensors disposed within or throughout the housing 110 of the ring 101. Each of the one or more sensors may transduce one or more of: light, sound, acceleration, translational or rotational movement, strain, temperature, chemical composition, surface conductivity or other suitable signals into electrical or electronic sensors or signals. A sensor may be acoustic, photonic, micro-electro-mechanical systems (MEMS) sensors, chemical, micro-fluidic (e.g., flow sensor), capacitive or any other suitable type of sensor. The sensor unit 150 may include, for example, an inertial motion unit (IMU) for detecting orientation and movement of the ring 101. Additionally or alternatively, the sensor unit 150 may include one or more sensors for measuring proximity or pressure.

The communication unit 160 may facilitate wired or wireless communication between the ring 101 and one or more other devices. The communication unit 160 may include, for example, a network adaptor to connect to a computer network, and, via the network, to network-connected devices. The computer network may be the Internet or another type of suitable network (e.g., a personal area network (PAN), a local area network (LAN), a metropolitan area network (MAN), a wide area network (WAN), a mobile, a wired or wireless network, a private network, a virtual private network, etc.). The communication unit 160 may use one or more wireless protocols, standards, or technologies for communication, such as Wi-Fi, near field communication (NFC), Bluetooth, or Bluetooth low energy (BLE). Additionally or alternatively, the communication unit 160 may enable free-space optical or acoustic links. In some implementations, the communication unit 160 may include one or more ports for a wired communication connections. The wired connections used by the wireless communication module 160 may include electrical or optical connections (e.g., fiberoptic, twisted-pair, coaxial cable).

User input unit 170 may collect information from a person wearing the ring 101 or another user, capable of interacting with the ring 101. In some implementations, one or more of the sensors in the sensor unit 150 may act as user input devices within the user input unit 170. User input devices may transduce tactile, acoustic, video, gesture, or any other suitable user input into digital or analog electrical signal, and send these electrical signals to the controller 140.

The output unit 190 may include one or more devices to output information to a user of the ring 101. The one or more output devices may include acoustic devices (e.g., speaker, ultrasonic); haptic (thermal, electrical, mechanical) devices; electronic displays for optical output, such as an organic light emitting device (OLED) display, a laser unit, a high-power light-emitting device (LED), etc.; or any other suitable types of devices. For example, the output unit 190 may include a projector that projects an image onto a suitable surface. In some implementations, the sensor unit 150, the user input unit 170, and the output unit 190 may cooperate to create a user interface with capabilities (e.g., a keyboard) of much larger computer systems, as described in more detail below.

The components 120, 130, 140, 150, 160, 170, and/or 190 may be interconnected by a bus 195, which may be implemented using one or more circuit board traces, wires, or other electrical, optoelectronic, or optical connections. The bus 195 may be a collection of electrical power or communicative interconnections. The communicative interconnections may be configured to carry signals that conform to any one or more of a variety of protocols, such as I2C, SPI, or other logic to enable cooperation of the various components.

II. EXAMPLE SMART RING FORM FACTOR TYPES

Figure 2:
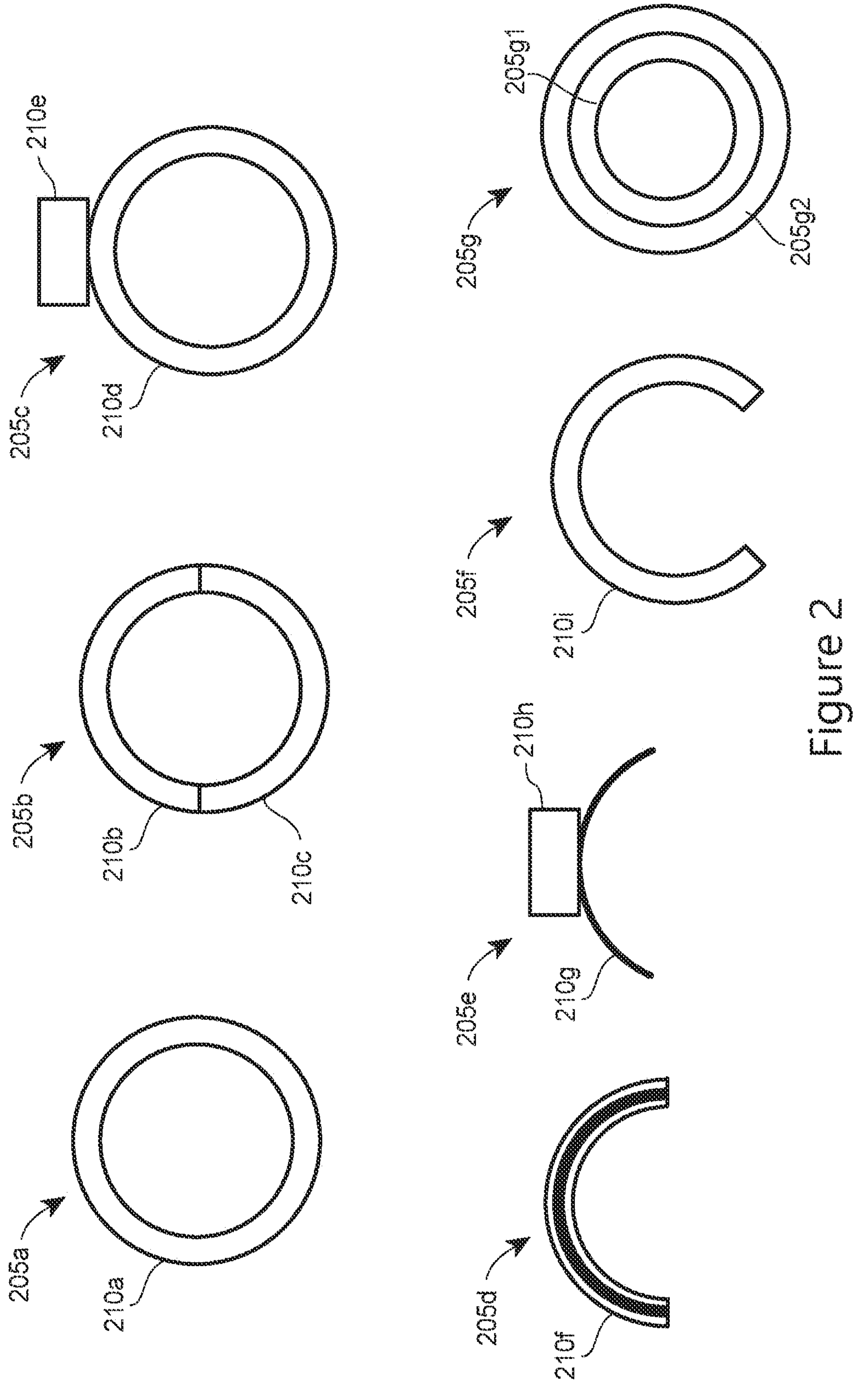
FIG. 2 illustrates a number of different form factor types of a smart ring according to some embodiments.

FIG. 2 includes block diagrams of a number of different example form factor types or configurations 205*a*, 205*b*, 205*c*, 205*d*, 205*e*, and/or 205*f* of a smart ring (e.g., the smart ring 101). In a charging system, the variety of configurations of the ring-shaped housing may influence, or, conversely, depend on the technique of energy transfer between a charging source and a power source of the smart ring. Furthermore, the configurations 205*a*, 205*b*, 205*c*, 205*d*, 205*e*, and/or 205*f* may depend on or determine the types of indicators or communication components disposed at the ring.

The configurations 205*a*, 205*b*, 205*c*, 205*d*, 205*e*, and/or 205*f* (which may also be referred to as the smart rings 205*a*, 205*b*, 205*c*, 205*d*, 205*e*, and/or 205*f*) may each represent an implementation of the smart ring 101, and each may include any one or more of the components 102 (or components similar to the components 102). In some embodiments, one or more of the components 102 may not be included in the configurations 205*a*, 205*b*, 205*c*, 205*d*, 205*e*, and/or 205*f*. The configurations 205*a*, 205*b*, 205*c*, 205*d*, 205*e*, and/or 205*f* include housings 210*a-f*, which may be similar to the housing 110 shown in FIG. 1.

The configuration 205*a* may be referred to as a band-only configuration comprising a housing 210*a*. In the configuration 205*b*, a band may include two or more removably connected parts, such as the housing parts 210*b* and 210*c*. The two housing parts 210*b* and 210*c* may each house at least some of the components 102, distributed between the housing parks 210*b* and 210*c* in any suitable manner. The configuration 205*c* may be referred to as a band-and-platform configuration comprising (i) a housing component 210*d* and (ii) a housing component 210*e* (sometimes called the "platform 210*e*"), which may be in a fixed or removable mechanical connection with the housing 210*d*. The platform 210*e* may function as a mount for a "jewel" or for any other suitable attachment. The housing component 210*d* and the platform 210*e* may each house at least one or more of the components 102 (or similar components).

In some instances, the term "smart ring" may refer to a partial ring that houses one or more components (e.g., components 102) that enable the smart ring functionality described herein. The configurations 205*d* and 205*e* may be characterized as "partial" smart rings, and may be configured for attachment to a second ring. The second ring may be a conventional ring without smart functionality, or may be second smart ring, wherein some smart functionality of the first or second rings may be enhanced by the attachment.

The configuration 205*d*, for example, may include a housing 210*f* with a groove to enable clipping onto a conventional ring. The grooved clip-on housing 210*f* may house the smart ring components described above. The configuration 205*e* may clip onto a conventional ring using a substantially flat clip 210*g* part of the housing and contain the smart ring components in a platform 210*h* part of the housing.

The configuration 205*f*, on the other hand, may be configured to be capable of being mounted onto a finger of a user without additional support (e.g., another ring). To that end, the housing 210*i* of the configuration 205*f* may be substantially of a partial annular shape subtending between 180 and 360 degrees of a full circumference. When implemented as a partial annular shape, the housing 210*i* may be more adaptable to fingers of different sizes that a fully annular band (360 degrees), and may be elastic. A restorative force produced by a deformation of the housing 210*i* may ensure a suitable physical contact with the finger.

The configuration 205*g* may be configured to have two rings, a first ring 205*g*1 capable of and adapted to be mounted onto a finger of a user, and a second ring 205*g*2 capable of and adapted to be directly mounted onto the first ring 205*g*1, as depicted in FIG. 2. Said another way, the first ring 205*g*1 and the second ring 205*g*2 are arranged in a concentric circle arrangement, such that the second ring 205*g*2 does not contact a user's finger when the smart ring 205*g* is worn. Rather, only the first ring 205*g*1 contacts the user's finger. Additional suitable combinations of configurations (not illustrated) may combine at least some of the housing features discussed above.

Figure 3:
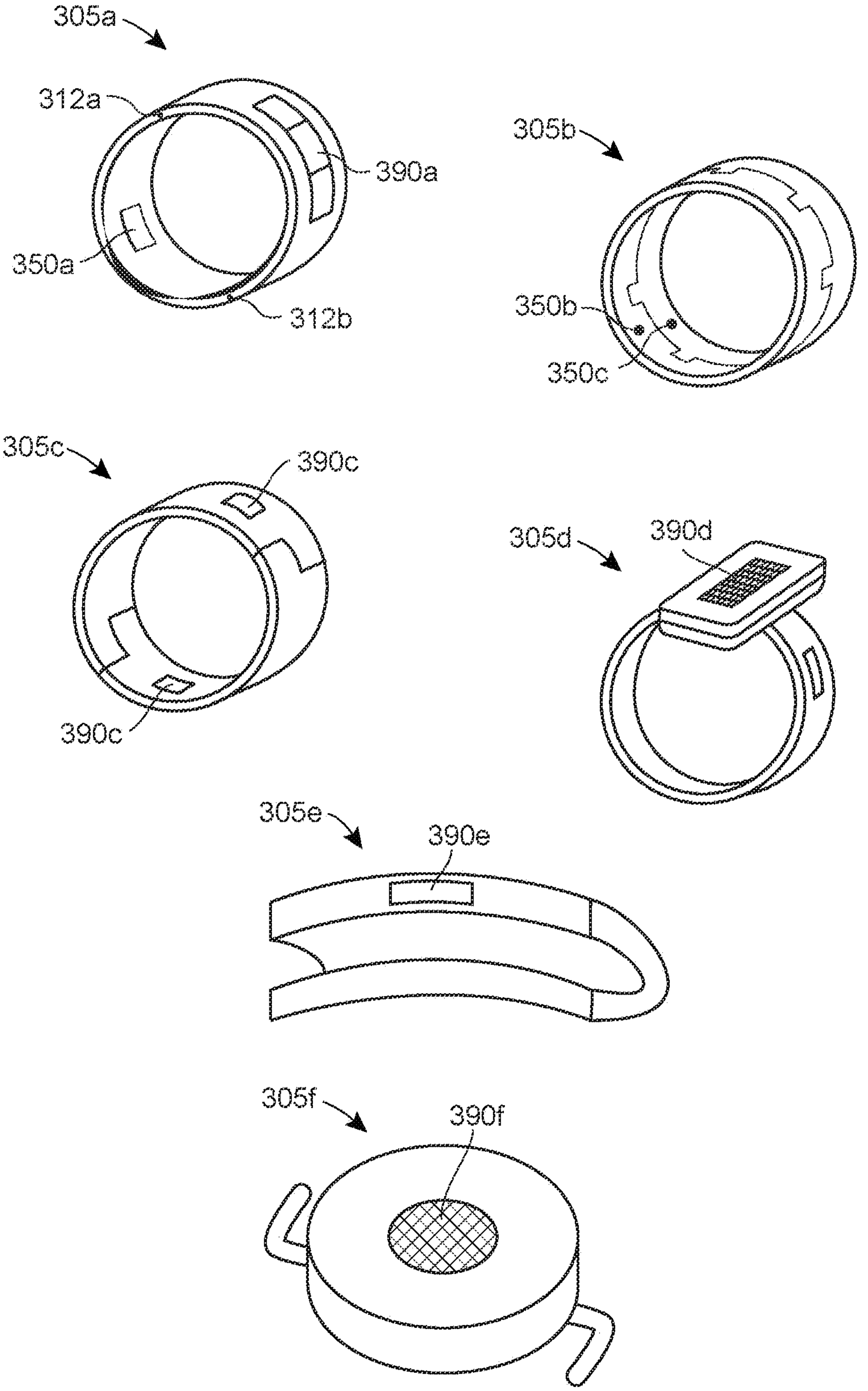
FIG. 3 illustrates examples of different smart ring form factors.

FIG. 3 includes perspective views of example configurations 305*a*, 305*b*, 305*c*, 305*d*, 305*e*, and/or 305*f* of a smart ring (e.g., the smart ring 101) in which a number of surface elements are included. In a charging system, the variety of configurations of the smart ring may influence, or, conversely, depend on the technique of energy transfer between a charging source and a power source of the smart ring. Additionally, some of the surface elements may be configured to indicate when a charging rate of the smart ring rises above or falls below a threshold, the charge remaining at the power source, etc.

Configuration 305*a* is an example band configuration 205*a* of a smart ring (e.g., smart ring 101). Some of the surface elements of the housing may include interfaces 312*a*, 312*b* that may be electrically connected to, for example, the charging unit 130 or the communications unit 160. On the outside of the configuration 305*a*, the interfaces 312*a*, 312*b* may be electrically or optically connected with a charger to transfer energy from the charger to a battery (e.g., the battery 120), or with another device to transfer data to or from the ring 305*a*. The outer surface of the configuration 305*a* may include a display 390*a*, while the inner surface may include a biometric sensor 350*a*.

The configurations 305*b* and 305*c* are examples of configurations of a smart ring with multiple housing parts (e.g., configuration 205*b* in FIG. 2). Two (or more) parts may be separate axially (configuration 305*b*), azimuthally (configuration 305*c*), or radially (nested rings, not shown). The parts may be connected mechanically, electrically, or optically via, for example, interfaces analogous to interfaces 312*a*, 312*b* in configuration 305*a*. Each part of a smart ring housing may have one or more surface elements, such as, for example, sensors 350*b*, 350*c* or output elements 390*b*, 390*c*. The latter may be LEDs (e.g., output element 390*b*) or haptic feedback devices (e.g., output element 390*c*), among other suitable sensor or output devices. Additionally or alternatively, at least some of the surface elements (e.g., microphones, touch sensors) may belong to the user input unit 170.

Configuration 305*d* may be an example of a band and platform configuration (e.g., configuration 205*c*), while configurations 305*e* and 305*f* may be examples of the partial ring configurations 205*d* and 205*e*, respectively. Output devices 390*d*, 390*e*, 390*f* on the corresponding configurations 305*d-f* may be LCD display, OLED displays, e-ink displays, one or more LED pixels, speakers, or any other suitable output devices that may be a part of a suite of outputs represented by an output unit (e.g., output unit 190). Other surface elements, such as an interface component 312*c* may be disposed within, at, or through the housing. It should be appreciated that a variety of suitable surface elements may be disposed at the illustrated configurations 305*a*, 305*b*, 305*c*, 305*d*, 305*e*, and/or 305*f* at largely interchangeable locations. For example, the output elements 390*d*, 390*e*, 390*f* may be replaced with sensors (e.g., UV sensor, ambient light or noise sensors, etc.), user input devices (e.g., buttons, microphones, etc.), interfaces (e.g., including patch antennas or optoelectronic components communicatively connected to communications units), or other suitable surface elements.

III. EXAMPLE OPERATING ENVIRONMENT FOR A SMART RING

Figure 4:
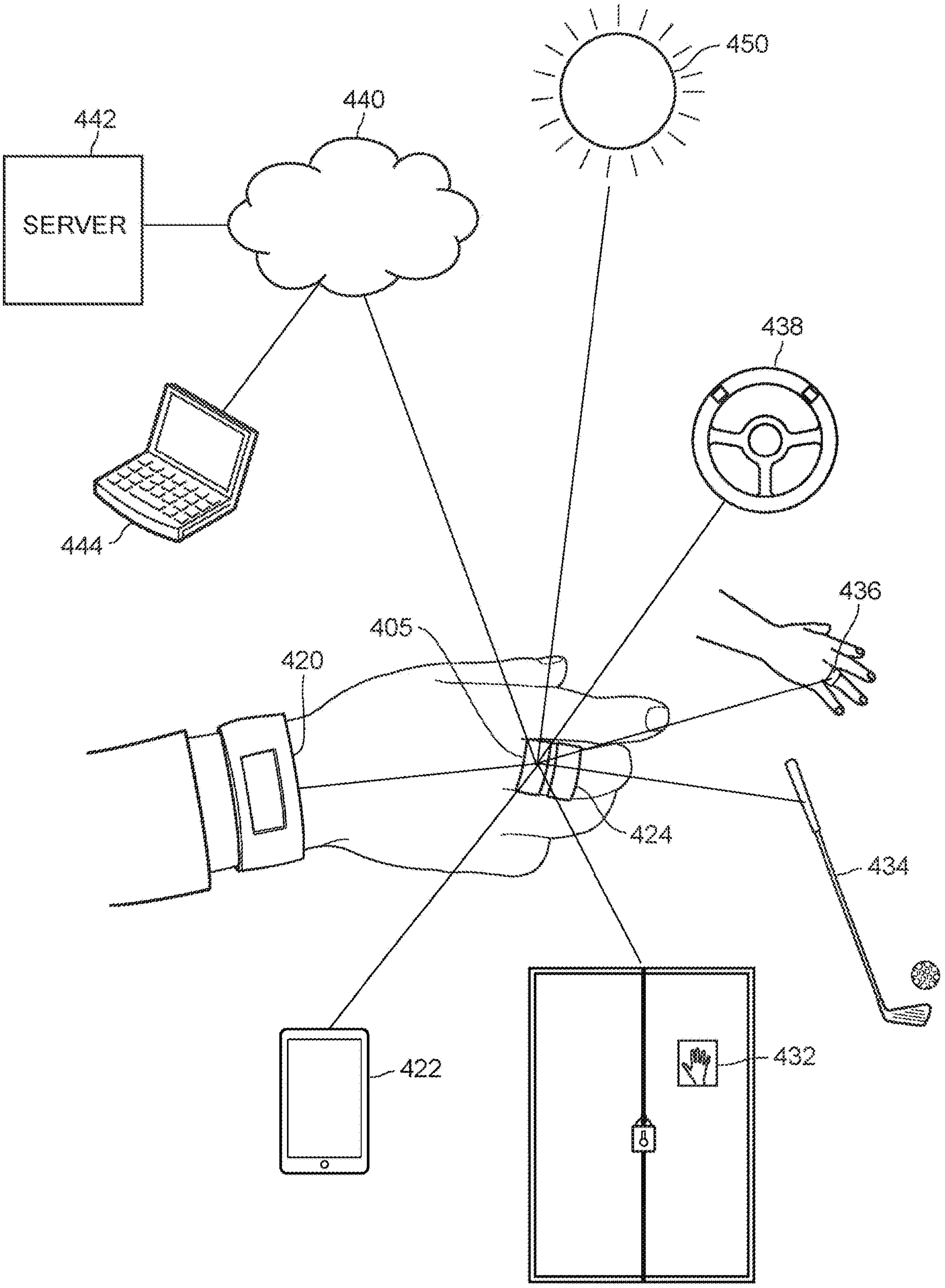
FIG. 4 illustrates an environment within which a smart ring may operate according to some embodiments.

FIG. 4 illustrates an example environment 400 within which a smart ring 405 may be configured to operate. The environment 400 includes examples of objects at which a charging source may be advantageously disposed in the charging systems discussed in this disclosure. In an embodiment, the smart ring 405 may be the smart ring 101. In some embodiments, the smart ring 405 may be any suitable smart ring capable of providing at least some of the functionality described herein. Depending on the embodiment, the smart ring 405 may be configured in a manner similar or equivalent to any of the configurations 205*a*, 205*b*, 205*c*, 205*d*, 205*e*, and/or 205*f* or 305*a*, 305*b*, 305*c*, 305*d*, 305*e*, and/or 305*f* shown in FIG. 2 and FIG. 3.

The smart ring 405 may interact (e.g., by sensing, sending data, receiving data, receiving energy) with a variety of devices, such as bracelet 420 or another suitable wearable device, a mobile device 422 (e.g., a smart phone, a tablet, etc.) that may be, for example, the user device 104, another ring 424 (e.g., another smart ring, a charger for the smart ring 405, etc.), a secure access panel 432, a golf club 434 (or another recreational accessory), a smart ring 436 worn by another user, or a steering wheel 438 (or another vehicle interface). Additionally or alternatively, the smart ring 405 may be communicatively connected to a network 440 (e.g., WiFi, 5G cellular), and by way of the network 440 (e.g., network 105 in FIG. 1) to a server 442 (e.g., server 107 in FIG. 1) or a personal computer 444 (e.g., mobile device 106). Additionally or alternatively, the ring 405 may be configured to sense or harvest energy from natural environment, such as the sun 450.

The ring 405 may exchange data with other devices by communicatively connecting to the other devices using, for example, the communication unit 160. The communicative connection to other device may be initiated by the ring 405 in response to user input via the user input unit 170, in response to detecting trigger conditions using the sensor unit 150, or may be initiated by the other devices. The communicative connection may be wireless, wired electrical connection, or optical. In some implementation, establishing a communicative link may include establishing a mechanical connection.

The ring 405 may connect to other devices (e.g., a device with the charger 103 built in) to charge the battery 120. The connection to other devices for charging may enable the ring 405 to be recharged without the need for removing the ring 405 from the finger. For example, the bracelet 420 may include an energy source that may transfer the energy from the energy source to battery 120 of the ring 405 via the charging unit 430. To that end, an electrical (or optical) cable may extend from the bracelet 420 to an interface (e.g., interfaces 112*a*, 112*b*, 312*a*, 312*b*) disposed at the housing (e.g., housings 110, 210*a-i*) of the ring 405. Other wearable charging devices may transfer charge to the ring 405 by any suitable means. In some implementations, a user may wear a glove with a built-in charging device configured to charge the ring 405. The mobile device 422, the ring 424, the golf club 434, the steering wheel 438 may also include energy source configured as chargers (e.g., the charger 103) for the ring 405. The chargers for may transfer energy to the ring 405 via a wired or wireless (e.g., inductive coupling) connection with the charging unit 130 of the ring 405.

IV. EXAMPLES OF CHARGING SYSTEMS FOR A SMART RING

Figure 5A:
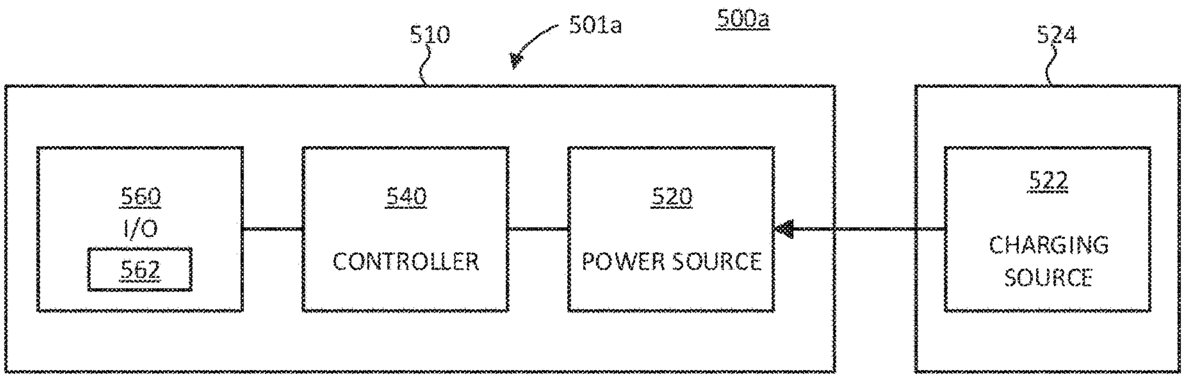
FIG. 5A, FIG. 5B, and FIG. 5C are schematic diagrams of example implementations of a charging system with an environment-integrated charging source for a smart ring.
Figure 5B:
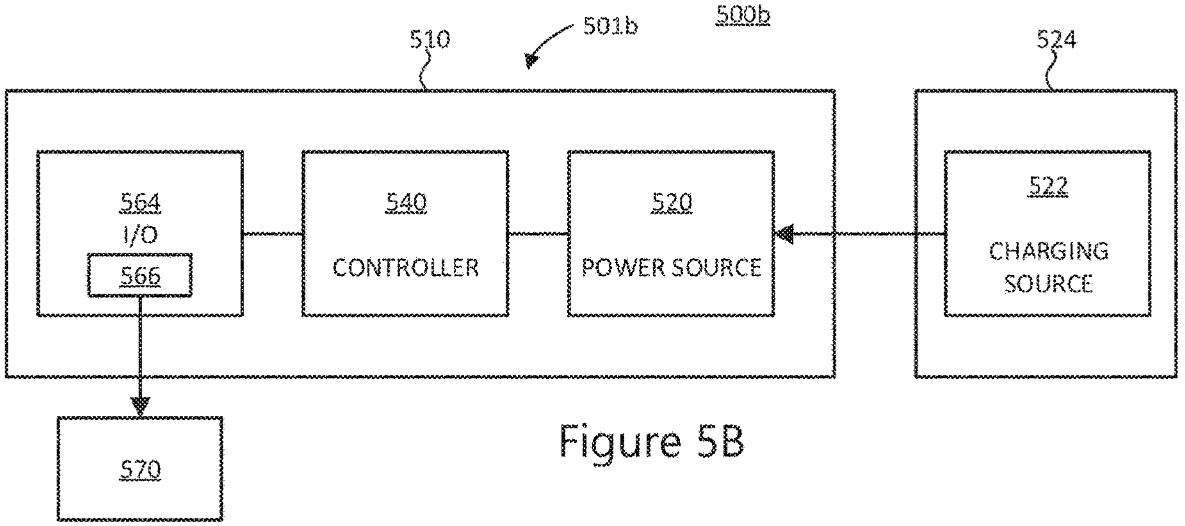
Figure 5C:
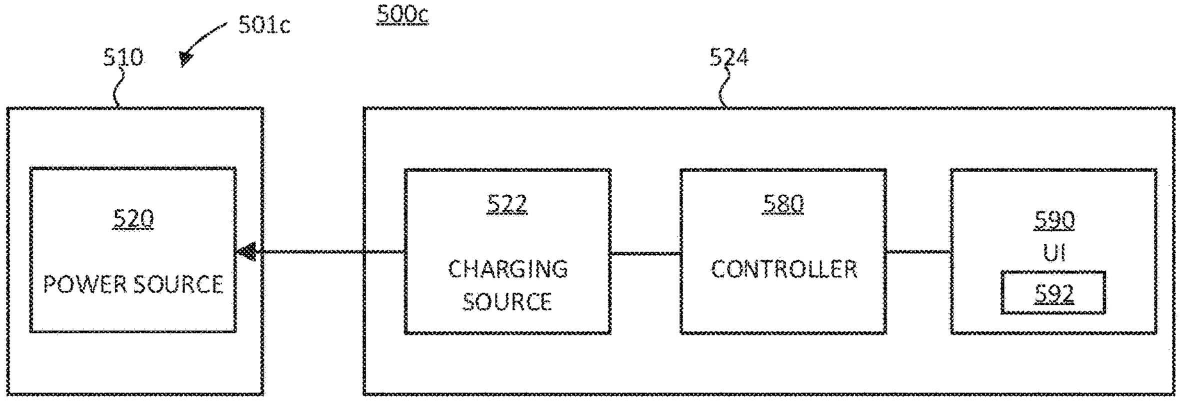

FIG. 5A, FIG. 5B, and FIG. 5C are schematic diagrams of example charging systems 500*a*, 500*b*, 500*c* for corresponding smart rings 501*a*, 501*b*, 501*c*. The smart rings 501*a*, 501*b*, 501*c* may exemplify the smart ring 101 of FIG. 1 or the smart ring 405 of FIG. 4 operating within the environment 400. As discussed below, the smart rings 501*a*, 501*b*, 501*c* may be configured for charging from charging sources integrated in some objects (e.g., golf club 434, steering wheel 438) disposed in the environment 400. Thus, a user of the smart ring 405 may advantageously charge the smart ring 405 in the course of the user's activities and without removing the ring 405 from the finger.

In FIG. 5A, for example, a ring-shaped housing 510 includes a power source 520 (e.g., battery 120) configured to receive energy from a charging source 522. The charging source 522 may be integrated into an object 524 (e.g., golf club 434, steering wheel 438, or another suitable object configured to be held by a user), so as to facilitate charging the power source 520 while the user is wearing the smart ring 501*a* and holding the object 524. The charging source 522 may be integrated into the object during a manufacturing step for the object 524. Alternatively, the charging source 522 may be a separate article of manufacture disposed at the object 524 as an addition, installed, for example, by the user of the object 524. If the charging source 522 disposed at the object 524 does not substantially impede the original use of the object 524, while facilitating the charging as described herein, the charging source 522 may be considered, in a sense, to be installed at the object 524. Besides the examples illustrated in the environment 400, the object 524 may be, for example, a handlebar of a motorcycle or a bicycle. Alternatively, the object 524 may be a hand-held object such as a cane, a tennis racket, an umbrella, etc. In some implementations, the object 524 may include an energy harvesting circuit configured to harvest kinetic, solar, thermal, or ambient radio energy and to supply the harvested energy to the charging source for subsequent transfer to the smart ring 501*a*.

A controller 540 (e.g., the controller 140) and one or more input/output (I/O) components 560 may be disposed within the ring-shaped housing 510. Both the controller 540 and the I/O components 560 may be electrically connected to and draw energy from the power source 520. Furthermore, the controller 540 may be communicatively connected to the power source 520 and to the I/O components 560. The I/O components 560 may implement, for example, the communication unit 160, the user input unit 170, or the output unit 190 of the smart ring 101. The I/O components 560 may include a user interface (UI) 562. The user interface 562 may include one or more visual indicators (e.g., light emitting diodes (LEDs), a display, etc.), one or more audio indicators (e.g., a speaker, a buzzer, etc.), or one or more haptic indicators (e.g., a haptic motor, a piezoelectric actuator, a voice coil, a micro-heater, etc.).

The controller 540 may be configured to estimate a charging rate at which the power source 520 receives energy from the charging source 522. To that end, the controller 540 may include a circuit that monitors voltage across the terminals of the power source 520. Additionally or alternatively, the controller 540 may include a circuit for monitoring current flowing into the power source 520. In some implementations, voltage or current monitoring circuits may be integrated into the power source 520 and the power source 520 may send signals indicative of the monitored voltage or current to the controller 540. In any case, the controller 540 may estimate a charging rate at which the power source 520 receives energy from the charging source 522 based at least in part upon the monitored current or voltage. The controller 540 may use a single sample or multiple samples of monitored current to estimate the charging rate. Additionally or alternatively, the controller 540 may use multiple samples of the monitored voltage at the power source as well as the time between the samples to estimate the charging rate. In some implementations, the controller 540 may estimate the charging rate averaged over a suitable time interval that may be 1, 2, 5, 10, 20, 50, 100 sec or any other suitable interval.

The controller 540 may compare the estimated charging rate to a threshold. The threshold charging rate may be, for example, 0.01 mAh/min, 0.1 mAh/min, 1 mAh/min, 10 mAh/min, etc. corresponding to currents of 0.6 mA, 6 mA, 60 mA, or 600 mA, etc. In response to detecting that the charging rate is above the threshold, the controller 540 may cause the I/O components to indicate that the power source 520 is charging using the user interface 562. In some implementations, when the charging rate is below the threshold for a pre-determined duration, the charging system 500*a* may cause the charging source 522 to switch off, as described in more detail below.

In some implementations, the controller 540 may cause an LED disposed at the ring-shaped housing 510 to turn on and remain turned on or to flash periodically to indicate that charging is in progress. Brightness, flashing rate, or flashing pattern of the LED may indicate the charging rate in some applications. In some implementations, the controller 540 may cause an organic LED (OLED), a liquid-crystal, or an e-ink display disposed at the ring-shaped housing 110 to display one or more symbols or characters indicative of the charging rate.

Additionally or alternatively, the controller 540 may cause an audio indicator of the user interface 562 (e.g., a buzzer, a speak, etc.) disposed at the ring-shaped housing 510 to produce a tone, a buzz, or any suitable sound to indicate that the power source 520 is charging. The tone, the buzz or any other sound may vary to indicate the charging rate of the power source 520.

Still additionally or alternatively, the user interface 562 may include a haptic indicator (e.g., a vibration motor, a voice coil, a piezo actuator, etc.) to provide the user with haptic feedback indicative of the charging rate, for example. For example, the controller 540 may cause the haptic indicator to produce a vibration or a sequence of taps of intensity, frequency, duration, and/or pattern indicative of the charging rate.

The charging system 500*a* may include a wired connection between the charging source 522 and the power source 520. In some implementations, the power source 520 may complete a circuit with the charging source 522 to thereby initiate charging. In other implementations, the charging source may include a switch and one or more sensors, with the switch configured to enable charging based at least in part upon the one or more sensors. In some implementations, the sensors at the charging source 522 may be configured to sense the load impedance to identify the power source 520 before initiating charging. Additionally or alternatively, the sensors at the charging source 522 may be configured to sense the voltage level at the power source 520 to determine whether the power source 520 is in need of charging, for example, and activate charging based at least in part upon the sensor output.

To facilitate charging via a wired connection of the power source 520 by the charging source 522, the charging source 522 and the power source 520 may include mating connectors. Furthermore, the object 524 into which the charging source is integrated may include one or more registration structures that aid in aligning the smart ring with the charging source 522 at the object 524 to facilitate the mating of the connectors. Furthermore, the one or more registration structures may give tactile feedback to the user indicative that the smart ring 501*a* is in position or, in some implementations, nearly in position for charging.

In some implementations, the power source 520 is configured to receive power from the charging source 522 by way of a wireless connection. For example, the wireless connection for power transfer may be implemented using inductive coupling. Specifically, the charging source 522 may include an oscillator (possibly followed by one or more amplifiers) supplying alternating current (AC) to a transmitting coil also disposed at the charging source 522. The power source 520 of the smart ring may receive energy from the charging source 522 via a charging unit (e.g., the charging unit 130 in FIG. 1) that includes a receiving coil and rectifying components. When the active transmitting coil is in suitable proximity to the receiving coil, magnetic flux generated by the current in the transmitting coil induces an AC voltage across terminals of the receiving coil. The rectifying components (e.g., suitably arranged diodes and capacitors) may rectify and smooth (i.e., convert to direct current (DC) waveform suitable for charging the power source 520) the AC waveform. Thus, the power source 520 may receive, via the receiving coil, the electrical energy transmitted by the charging source 522 via the transmitting coil.

Wireless power transfer via inductive coupling may rely on one or both of two general techniques. In the first, the transmitting and receiving coils are disposed in close proximity and coaxial alignment so that the magnetic flux through one coil largely goes through the other coil. Thus, the coils are closely-coupled. The degree to which the magnetic flux is shared between the two coils can be quantified as a coupling coefficient, which may be 0.05, 0.1, 0.2, 0.4, 0.6, 0.8 or another suitable value. Power transfer efficiency may be largely dependent on and marginally smaller than the coupling coefficient.

The second inductive coupling technique uses resonant inductive coupling. In this technique, the transmitting and receiving coil may have a substantially smaller coupling coefficient. On the other hand, the transmitting and receiving inductive coils may be connected to corresponding capacitive elements to form corresponding resonant circuits that, when properly tuned, ensure efficient power transfer despite a reduced coupling coefficient. The frequency of the oscillator may be tuned to match the resonance frequency of the circuits. The resonant inductive power transfer may transfer power with greater separation between the transmitting and receiving coils, though power transfer efficiency may be smaller (e.g., efficiency of 1, 2, 5, 10%) than when using closely-coupled coils.

With either closely-coupled coils or resonant inductive coupling, the rate of wireless transmission of energy may vary substantially in response to the relative position between transmitting and the receiving coils. Thus, the indicators in the user interface 562, such as the ones described above, may prompt the user to adjust the position of a hand (with the smart ring) holding the object 524 so as to achieve a higher charging rate. Additionally or alternatively, it may be advantageous to dispose indicators outside of the smart ring. For example, in some implementation or situations, the indicators disposed at the ring may not be easily noticeable by a user. Also, disposing indicators outside of the ring-shaped housing 510 may reduce the power consumption for the power source 520.

FIG. 5B schematically illustrates the charging system 500*b* in which the ring-shaped housing 510 includes a set of I/O components 564 that include a transmitter 566 (that may be referred to, more generally, as a communication component and may be a part of a transceiver) configured to transmit communication signals to a communication device external to the ring-shaped housing 510. The communication signal transmitted by the transmitter 566 may be indicative of the charging rate. One or more indicators, including indicator 570 may be disposed outside of the smart ring 501*b* and configured to indicate the charging rate in response to the signal transmitted by the transmitter 566. To that end, the indicator 570 may be in communicative connection with a receiver configured for receiving the signals transmitted by the transmitter 566. For example, the transmitter 566 and the corresponding receiver may be configured to communicate over radio waves using a WiFi, a Bluetooth, a Bluetooth Low Energy (BLE), or any other suitable protocol. In some implementations, the transmitter 566 and a corresponding receiver may implement an infrared link between the smart ring and the indicator 570.

The indicator 570 may be a visual indicator, an audio indicator, or a haptic indicator and may be disposed at any convenient location. For example, in implementations where the object 524 with the charging source 522 is a steering wheel of a vehicle or a handlebar of a motorcycle, the indicator 570 may be disposed at a corresponding head unit of the vehicle or the motorcycle. The indicator 570 may also be an audio indicator disposed within the audio system of the vehicle or the motorcycle.

In some implementations, the indicator 570 may be disposed at the object 524. For example, when the object is a golf club or a tennis racket, the indicator may be an LED, or a haptic motor disposed at a corresponding handle of the object 524. In some implementations, the indicator 570 may be integrated with the charging source 522 disposed at the object 524, as discussed in more detail below.

In other implementations, the indicator 570 may be integrated into a mobile device (e.g., a smart phone, a smart watch, or another suitable device other than the smart ring) of the user. For example, a smart ring application running on a smart phone of the user may generate, based at least in part upon the signal received from the transmitter 566, notifications indicative of the charging rate of the smart ring and use any of the output device of the smart phone as the indicator 570.

Multiple indicators 570 may be used to indicate the charging rate of the smart ring power source 520 to the user. The indicators may be disposed at multiple locations and may be configured to receive the one or more signals indicative of the charging rate of the power source from the transmitter 566. In an alternative implementation, the user mobile device may receive the signal from the transmitter 566, and may in turn cause multiple indicators 570, disposed at or communicatively connected to the mobile device, to indicate the charging rate.

FIG. 5C schematically illustrates the charging system 500*c* in which estimating the charging rate at which the power source 520 receives energy from the charging source 522 and indicating the charging rate (e.g., when the charging rate is above a threshold) is implemented by components disposed at the object 524 with the charging source 522. To that end, a controller 580 and a user interface 590, including one or more indicators, are disposed at the object 524. The controller 580 may be communicatively connected to the charging source 522 and to the user interface 590. The controller 580 may estimate the charging rate using a technique suitable for the implemented method of charging. For example, when the charging source 522 is configured to transmit power to the power source 520 via a wired connection, the controller 580 may estimate the charging rate using a circuit indicative of current supplied by the charging source 522. This approach may work well for a wired connection in which charging efficiency is substantially stable. When the charging source 522 is configured to transmit power to the power source 520 via a wireless connection, on the other hand, the controller 580 may rely on additional techniques to estimate the charging rate. For example, the controller 580 may include or be electrically connected to a circuit configured for measuring a reflection coefficient at the output or another suitable stage of the charging source 522. The reflection coefficient may be indicative of the coupling efficiency between the wireless power transfer elements (e.g., coils, as described above) of the charging source 522 and the power source 520, and, consequently, of the charging rate.

Additionally or alternatively, the power source 520 of the charging system 500*c* may be communicatively connected to a controller (e.g., controller 540) disposed in the ring-shaped housing 510. The controller of the smart ring may be configured to communicate with the controller 580 connected to the charging source 522 via corresponding communication components (e.g., at the smart ring-communication unit 160 or transmitter 566 and a suitable counterpart at the object 524). For example, the controller 540 connected to the power source 520 may estimate the charging rate of the power source 520 using one of the techniques described above and send a signal, indicative of the charging rate, via the communication component at the smart ring. The controller 580 may receive, via the communication unit at the object 524, the signal indicative of the charging rate and cause the user interface 590 to indicate the whether there is charging, whether the charging rate is above a threshold, etc. In some implementations, a component configured for the wireless charging may be integrated in the same chip with the communication components that exchange signals indicative of the charging.

In the charging systems 500*a*, 500*b*, 500*c* described above, the charging source 522 may be configured to activate, conditionally, in response to detecting a connection to or proximity of the power source 520. In the case of a wired power transfer connection, the conditional activation of the charging source 522 may prevent the charging source 522 from transferring power to an incompatible device or to a spurious load, such as an accidental short circuit. In the case of the wireless power transfer connection, the conditional activation of the charging source 522 may prevent wasting power. Conditional activation of the charging source 522 may prevent, for example, activation the transmitting coil of an inductive coupling system when the receiving coil is not in the condition to receive the power.

To detect proximity of the smart ring to the charging source 522, the object 524 may include one or more sensors. The one or more sensors may include optical, capacitive, radio frequency identification (RFID), ultrasonic, pressure or any other suitable sensors capable of detecting a hand of a user or the smart ring directly. The charging source 522 may be configured to activate (i.e., start transmitting energy) in response to the detection. Furthermore, the charging source 522 may be configured to subsequently deactivate (i.e., stop transmitting energy) after a delay and upon determining that the estimated charging rate is below a threshold.

Additionally or alternatively, a user interface, disposed at the object 524 (e.g., in the charging system 500*c*), at the ring-shaped housing 510 (e.g., in the charging system 500*a*), or elsewhere (e.g., in the charging system 500*b*) may be configured to indicate proximity of the smart ring to the charging source 522. In some implementations, the indication of proximity may allow the user to adjust the position of the smart ring with respect to the charging source 522 to facilitate charging. For example, a user interface may indicate proximity of the smart ring to the charging source and a low charging rate. In response, the user may then adjust a grip on the object (e.g., a steering wheel) to increase the charging rate. In an implementation, a grip on the steering wheel that substantially maximizes the charging rate may be associated with the recommended hand position from the consideration of safety.

In general, the charging systems 500*a*, 500*b*, 500*c* may include sensors, communication components, and indicators disposed at the corresponding smart rings 501*a*, 501*b*, 501*c*, at the object 524, or elsewhere in the environment. These sensors, communication components, and indicators may cooperate, as described above, with each other and with the controllers 540, 580 to facilitate the transfer of energy from the charging source 524 to the power source 520 in an efficient manner. The efficiency may be improved by a user responding to the indicators to actively facilitate or terminate the charging operation, or by the controllers 540, 580 responding to sensors and automatically initiating, adjusting, or terminating the charging operation.

V. EXAMPLES OF OTHER CONSIDERATIONS

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

The described functions may be implemented, in whole or in part, by the devices, circuits, or routines of the system 100 shown in FIG. 1. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present disclosure has been described with reference to specific examples, which are intended to be illustrative only and not to be limiting of the present disclosure, it will be apparent to those of ordinary skill in the art that changes, additions or deletions may be made to the disclosed embodiments without departing from the spirit and scope of the present disclosure.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification may not be all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements may not be limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. Generally speaking, when a system or technique is described as including "a" part or "a" step, the system or technique should be read to include one or at least one part or step. Said another way, for example, a system described as including a blue widget may include multiple blue widgets in some implementations (unless the description makes clear that the system includes only one blue widget).

Throughout this specification, some of the following terms and phrases are used.

Communication Interface according to some embodiments: Some of the described devices or systems include a "communication interface" (sometimes referred to as a "network interface"). A communication interface enables the system to send information to other systems and to receive information from other systems, and may include circuitry for wired or wireless communication.

Each described communication interface or communications unit (e.g., communications unit 160) may enable the device of which it is a part to connect to components or to other computing systems or servers via any suitable network, such as a personal area network (PAN), a local area network (LAN), or a wide area network (WAN). In particular, the communication unit 160 may include circuitry for wirelessly connecting the smart ring 101 to the user device 104 or the network 105 in accordance with protocols and standards for NFC (operating in the 13.56 MHz band), RFID (operating in frequency bands of 125-134 kHz, 13.56 MHz, or 856 MHz to 960 MHZ), Bluetooth (operating in a band of 2.4 to 2.485 GHZ), Wi-Fi Direct (operating in a band of 2.4 GHz or 5 GHZ), or any other suitable communications protocol or standard that enables wireless communication.

Communication Link according to some embodiments: A "communication link" or "link" is a pathway or medium connecting two or more nodes. A link between two end-nodes may include one or more sublinks coupled together via one or more intermediary nodes. A link may be a physical link or a logical link. A physical link is the interface or medium(s) over which information is transferred, and may be wired or wireless in nature. Examples of physicals links may include a cable with a conductor for transmission of electrical energy, a fiber optic connection for transmission of light, or a wireless electromagnetic signal that carries information via changes made to one or more properties of an electromagnetic wave(s).

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Memory and Computer-Readable Media according to some embodiments: Generally speaking, as used herein the phrase "memory" or "memory device" refers to a system or device (e.g., the memory unit 144) including computer-readable media ("CRM"). "CRM" refers to a medium or media accessible by the relevant computing system for placing, keeping, or retrieving information (e.g., data, computer-readable instructions, program modules, applications, routines, etc.). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information, and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network according to some embodiments: As used herein and unless otherwise specified, when used in the context of system(s) or device(s) that communicate information or data, the term "network" (e.g., the networks 105 and 440) refers to a collection of nodes (e.g., devices or systems capable of sending, receiving or forwarding information) and links which are connected to enable telecommunication between the nodes.

Each of the described networks may include dedicated routers responsible for directing traffic between nodes, and, optionally, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be capable of high-volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. If desired, each described network may include networks or sub-networks, such as a local area network (LAN) or a wide area network (WAN).

Node according to some embodiments: Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Processor according to some embodiments: The various operations of example methods described herein may be performed, at least partially, by one or more processors (e.g., the one or more processors in the processor unit 142). Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as “processing,” “computing,” “calculating,” “determining,” “presenting,” “displaying,” or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

The invention claimed is:

1. A charging system, comprising:
a housing, comprising:
a controller; and
a power source configured to power the controller; and
a wireless charger configured to transfer energy to the power source, wherein the wireless charger provides:
a first visual output having a first periodic flashing pattern; and
a second visual output having a second periodic flashing pattern.

2. The charging system of claim 1, wherein the wireless charger comprises:
a first indicator configured to provide:
the first visual output at the first periodic flashing pattern; and
the second visual output at the second periodic flashing pattern.

3. The charging system of claim 1, wherein:
one or more of the first visual output or the second visual output are configured to indicate a charging rate of the power source.

4. The charging system of claim 1, wherein:
one or more of the first visual output or the second visual output comprises a light emitting diode (LED).

5. The charging system of claim 1, wherein the wireless charger provides:
a third visual output comprising a first flashing rate.

6. The charging system of claim 1, wherein:
the wireless charger is integrated into an object in an environment of a user of the housing.

7. The charging system of claim 1, wherein the wireless charger further provides:
one or more of an audio output or a haptic output indicative of a first charging status of the power source or a second charging status of the power source.

8. The charging system of claim 1, wherein:
the wireless charger uses inductive coupling to transfer energy from the wireless charger to the power source.

9. The charging system of claim 1, wherein:
the controller is configured to detect that a charging rate at which the power source is receiving energy from the wireless charger is above a threshold.

10. A method for charging a housing, comprising:
providing the housing, comprising:
providing a controller; and
providing a power source configured to power the controller; and
providing a wireless charger configured to transfer energy to the power source, wherein the wireless charger provides:
a first visual output having a first periodic flashing pattern; and
a second visual output having a second periodic flashing pattern.

11. The method of claim 10, wherein providing the wireless charger further comprises:
providing a first indicator configured to provide:
the first visual output at the first periodic flashing pattern; and
the second visual output at the second periodic flashing pattern.

12. The method of claim 10, wherein:
one or more of the first visual output or the second visual output are configured to indicate a charging rate of the power source.

13. The method of claim 10, wherein:
one or more of the first visual output or the second visual output comprises a light emitting diode (LED).

14. The method of claim 10, wherein the wireless charger provides:
a third visual output comprising a first flashing rate.

15. The method of claim 10, wherein:
the wireless charger is integrated into an object in an environment of a user of the housing.

16. The method of claim 10, wherein the wireless charger further provides:
one or more of audio output or haptic output indicative of a first charging status of the power source or a second charging status of the power source.

17. The method of claim 10, further comprising:
transferring energy from the wireless charger to the power source using inductive coupling.

18. The method of claim 10, further comprising:
detecting, by the controller, that a charging rate at which the power source is receiving energy from the wireless charger is above a threshold.

19. A charging system, comprising:
a housing, comprising:
a controller and at least one sensor; and
a power source configured to power the controller; and a wireless charger configured to transfer energy to the power source, wherein the wireless charger provides:
a first visual output having a first periodic flashing pattern; and
a second visual output having a second periodic flashing pattern.

20. The charging system of claim 19, wherein the wireless charger comprises:

a first indicator configured to provide:
the first visual output at the first periodic flashing pattern; and
the second visual output at the second periodic flashing pattern.

* * * * *